United States Patent
Ramachandran et al.

(10) Patent No.: US 8,135,379 B2
(45) Date of Patent: Mar. 13, 2012

(54) AUTO-CONTROL OF RADIATION POWER IN A PORTABLE TELECOMMUNICATION SYSTEM

(75) Inventors: Sethuraman Ramachandran, Erie, CO (US); Amy Derbyshire, Boulder, CO (US); Janardan Sethi, Erie, CO (US); Douglas A. Sharp, Longmont, CO (US); Joseph Meagher, Lafayette, CO (US); Mark Bailey, Louisville, CO (US); Mark Leifer, Boulder, CO (US); Mark Gibbard, Beaverton, OR (US); Ramesh Ramiah, Troy, MI (US); Raghavan Srinivasan, Berkeley, CA (US); Mitch Cooper, Frederick, CO (US)

(73) Assignee: Telefoanktiebolaget L M Ericsson (Publ), Stockholm (SE)

( * ) Notice: Subject to any disclaimer, the term of this patent is extended or adjusted under 35 U.S.C. 154(b) by 958 days.

(21) Appl. No.: 12/105,932

(22) Filed: Apr. 18, 2008

(65) Prior Publication Data
US 2009/0264162 A1    Oct. 22, 2009

(51) Int. Cl.
H04M 11/04    (2006.01)

(52) U.S. Cl. ................ 455/404.2; 455/440; 455/448

(58) Field of Classification Search ............... 455/404.2, 455/419, 420, 448, 440, 452.2, 561, 115.1–115.3, 455/127.1, 572
See application file for complete search history.

(56) References Cited

U.S. PATENT DOCUMENTS

| | | | |
|---|---|---|---|
| 7,047,015 B2* | 5/2006 | Hawe ......................... | 455/450 |
| 7,373,161 B2* | 5/2008 | Anderson ................... | 455/522 |
| 2007/0105575 A1 | 5/2007 | Sampath et al. | |
| 2009/0005102 A1* | 1/2009 | Das et al. .................... | 455/522 |
| 2009/0143078 A1* | 6/2009 | Tu et al. ..................... | 455/456.3 |

FOREIGN PATENT DOCUMENTS
EP    1343336 A    9/2003

* cited by examiner

Primary Examiner — Christian Hannon
(74) Attorney, Agent, or Firm — Roger S. Burleigh

(57) ABSTRACT

A portable telecommunications system (PTS) allows mobility and rapid deployment with minimal on-site configuration. PTS systems exchange multicast packets including location and identification information. A protocol manager sets up these communications channels, manages exchanges between PTS systems, and passes the data to or from internal system nodes. The PTS system detects when another PTS system is operating in close physical proximity and automatically perform actions, such as adjustment of transmission power level, to maintain service to the user base.

20 Claims, 14 Drawing Sheets

AUTO-CONTROL OF RADIATION POWER IN A PORTABLE TELECOMMUNICATION SYSTEM

FIELD OF THE INVENTION

The present invention relates to a method and system for controlling radiation power in a communications node, and more particularly, to a method and system for automatically controlling of the state of a radio base station (RBS) of a telecommunications system.

BACKGROUND

For military, civil defense or disaster recovery operations, it is advantageous to deploy portable systems that can rapidly be brought into service. With respect to portable telecommunications systems, a "network-in-a-box" system is a portable system containing the Radio Access Network (RAN) as well as the core network components. Such a scaled-down system may be independent of the radio access technology used (e.g., UMTS, GSM, CDMA etc.), and is capable of providing telecommunications services to user equipment (UE) in a radio coverage area without being dependent on physical connectivity to any other telecommunications infrastructure. The system is completely self-contained and is capable of stand-alone operation.

Current network-in-a-box system deployments, however, prevent use of highly available types of systems (or highly available and redundant communication links) because of cost and/or survivability issues associated with operating conditions. Furthermore, a centralized solution would be impractical, and a distributed solution operating under realistic operating conditions should be robust against intermittent or permanent failures. Deploying a number of these homogeneous systems in a network configuration provides resilience to failures of individual systems because even if one or more systems in the network fail, the network may continue to provide cellular service.

When such a distributed system is deployed and utilizes an IP network to provide communication between individual systems, it is possible for the UEs being served by these systems to roam from one system to another. Also, it is expected that UEs will be able to access the full suite of services at each system.

A standard commercial cellular network uses an enormous number of configuration interfaces and parameters. Fully configuring such a network and bringing it into operation can take days and the efforts of many site personnel. Also, the users of such systems (e.g., soldiers, emergency responders) are typically not trained telecommunications engineers. These users, therefore, often have neither the knowledge nor the time that would be necessary to configure an entire cellular network. Accordingly, the configuration of such systems is typically reduced to the bare essentials to allow non-specialist operators can configure the system quickly and easily.

Though "network-in-a-box" systems exist for GSM and CDMA radio technologies (e.g., Universal Mobile Telecommunications System (UMTS)), these systems are usually intended for commercial applications and are complex to configure. They function as small-scale copies of the standard networks. Also, these systems are deployed in static topologies where the "neighbors" of each system are known in advance and are configured manually in each system. Thus, a network of such small-scale systems cannot be formed in an ad-hoc manner without extensive user planning and intervention.

SUMMARY

A portable telecommunications system includes protocols that enable network telecommunications system node to adjust its transmission power level relative to another network node communicating on the network.

One aspect of the invention involves a method for controlling a radiating state of a radio base station (RBS) of a telecommunications system node among a network of telecommunications system nodes, which includes a local network node and at least one remote network node. The method includes maintaining a persistent record for storing a plurality of data groups at the local network node. Each of the data groups is associated with one of the telecommunications system nodes and comprises node identifying data and configuration data. The local network node generates presence messages including data identifying the local network node and position data of the local network node, which are periodically sent from the local network node to each remote node identified in the persistent record. The local network node also receives incoming presence messages sent by remote network nodes in the network, each containing data identifying the remote network node and position data of the remote network node. Utilizing the location information of the local and remote nodes, the local node determines a distance between the local network node and the remote network node, and the local node and adjusts the power of the RBS based on the determined distance and a predetermined threshold value.

Other aspects of the invention involve a portable telecommunications system, which may include all the components necessary for establishing mobile communications within an area of coverage (e.g., as a stand alone device), and may be included within a network of other like devices to provide coverage to several areas that also may overlap with one another.

The portable telecommunications system includes a radio base station (RBS) for radiating an information signal, and a device for determining its position and generating and transmitting presence messages at predetermined intervals. For instance, the telecommunications device may include a GPS receiver, from which information is provided to determine the device location. The device also comprises memory for storing a plurality of data groups. Each of the data groups comprises node identifying data associated with a telecommunications system node among a network of telecommunications nodes, and configuration data comprising a predetermined threshold value.

The system includes a program management module that operates to periodically send a presence message including data identifying the portable telecommunications system and the location information about the portable telecommunications system from the portable telecommunications system to each remote telecommunications system identified in the memory. The program management module also operates to receiving a presence messages sent from remote telecommunication system. These incoming presence messages comprise information about the remote telecommunications system that identifies the system and its location.

A proximity handing module is included in the portable telecommunications system for determining a distance between the portable telecommunications system and the remote telecommunications system using the location information generated by the portable and remote communication systems. The power of the RBS is adjusted based on the distance and the predetermined threshold value.

It should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

It is to be understood that both the foregoing general description and the following detailed description are exemplary and exemplary only and are not restrictive of the invention, as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention. In the drawings.

DETAILED DESCRIPTION

Figure 1:
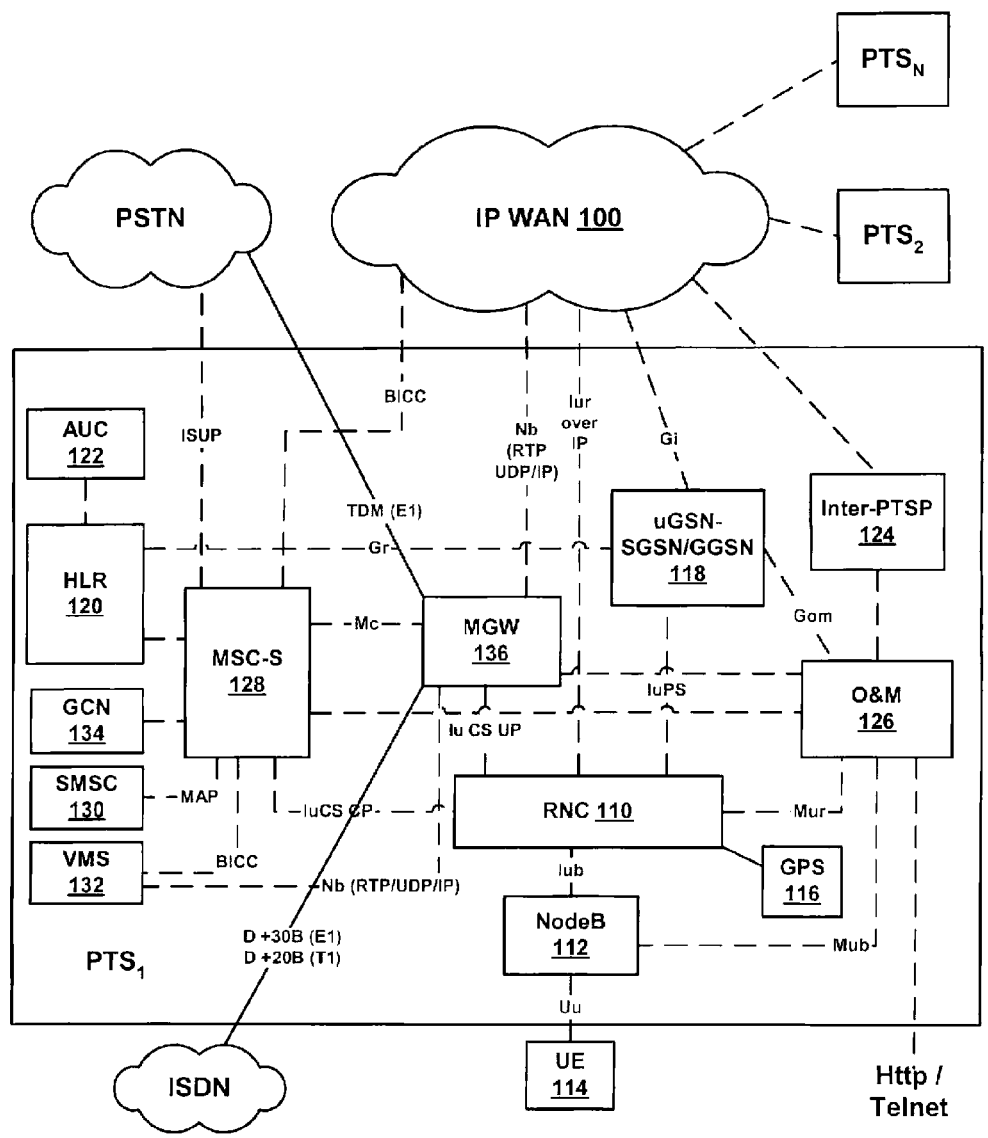
FIG. 1 is a diagram of exemplary portable telecommunication system (PTS) components and interfaces and a community of PTS nodes and in accordance with exemplary embodiments.

The various features of the invention will now be described with reference to the figures. These various aspects are described hereafter in greater detail in connection with a number of exemplary embodiments to facilitate an understanding of the invention, but should not be construed as limited to these embodiments. Rather, these embodiments are provided so that the disclosure will be thorough and complete, and will fully convey the scope of the invention to those skilled in the art.

Many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions, such as program modules, being executed by one or more processors, or by a combination of both. Moreover, the invention can additionally be considered to be embodied entirely within any form of computer readable carrier or medium, such as solid-state memory, magnetic disk, and optical disk containing an appropriate set of computer instructions, such as program modules, and data structures that would cause a processor to carry out the techniques described herein. A computer readable carrier or medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), an optical fiber, and a portable compact disc read-only memory (CD-ROM), or any other medium capable of storing information. Thus, the various aspects of the invention may be embodied in many different forms, and all such forms are contemplated to be within the scope of the invention.

A network can be considered as a collection of linked devices called nodes, each of which is connected to at least one other node. A node may include a switching device having wired, optical and/or wireless connections. For example, a node may be a router or switch handling packet streams, a combination router-switch handling connections and packet traffic, a bridge or a hub. A node also may include a personal computer (PC), personal digital assistant, cell phone, set top box, server computer, hand-held device, laptop device, multiprocessor system, microprocessor-based system, programmable consumer electronics, network PC, minicomputer, mainframe computer, printer, scanner, camera, or other general purpose or application specific device.

As described herein, a node may include a plurality of network elements localized in such a way that it may be considered an individual portable telecommunication system (PTS) capable of supporting a large number of information sources and receivers that dynamically exchange information, or have fixed source/receiving roles, of varying activity. For instance, a PTS node in some embodiments may comprise a telecommunication system serving a plurality of subscribers, such as a plurality of mobile stations, over a wide area network (WAN) via a gateway. Such a system may provide subscribers who operating user equipment (UE) access to any of several networks (e.g., PSTN, IP WAN, ISDN), or combinations thereof.

It is noted that for practical purposes of explanation, the term "local" is sometimes used herein in the context of one particular system currently being considered among other systems in a network. For example, the following may use the term "local" in connection when describing a PTS system, one or more of its components, and procedures or functions that it is capable of performing relative at least one other "remote" system, component, and procedure or function performed in the network. Thus, any system, component, and procedure or function performed in the community may be considered "local" in the context of "this" system, component, procedure or function while any other system, component, procedure or function in the network may be considered "remote."

While an individual PTS may operate as a stand-alone unit to serve subscribers within a single service area, a plurality of PTSs may be added in an ad-hoc manner to form an autonomous network, called a "community," with IP-based inter-connectivity. Because a community may operate in a dynamic environment in which individual node devices or systems join or leave the community at any time and physical proximity between them may change continuously, inter-device protocols run on each PTS node to disseminate information about the node systems throughout the community and enable the nodes to automatically discover one another.

Network discovery involves finding out which devices are connected to the network. The discovery process typically involves finding information about devices linked to the network, for example, a device's IP address, its type, and capabilities. In some embodiments described herein, individual portable telecommunication systems (PTS) discover the presence of other portable telecommunication systems, exchange system data such as subscriber and configuration information, automatically configure inter-system signaling links (e.g., MSC-MSC, RNC-RNC, SGSN-SGSN links), and provide a mobile and seamless canopy of coverage to system users who may roam freely between individual PTSs.

Reference is now made to FIG. 1, which shows an exemplary IP wide area network (WAN) 100 including a community of PTS nodes consistent with some embodiments. For ease of explanation, FIG. 1 shows three representative PTS nodes: $PTS_1$, $PTS_2$, and $PTS_N$, but it should be appreciated that a fewer or greater number of nodes may be present or operating at any instant in time. Additionally, it should be appreciated that the IP WAN 100 may include nodes that do not communicate using a same protocol as peer PTS devices. Furthermore, it should be understood that the network shown in FIG. 1 is only one example of a network configuration, and thus any practical number and combination of peer nodes including sub-networks and linking elements, such as hubs, switches, bridges or routers, may be present in a given implementation. In some embodiments, any one of $PTS_1$ to $PTS_N$ may be connected to the IP WAN 100 via a router, although other intermediary devices may be used, such as a modem, hub, switch, bridge, a router/bridge combination or router/switch combination.

The IP WAN 100 may be an IPv4 and IPv6 Core network, the Internet, an intranet, or other type of packet data network (PDN)), but may be preceded by a local area network (LAN), a wireless local area network (WLAN), a combination of a LAN and WLAN, a virtual network or other types of networks. In some embodiments, each $PTS_1$ to $PTS_N$ may be identified by a unique address, such as an IP address, although nodes in some network implementations may include one or more other types of identifying information, such as a MAC address and/or an assigned value.

FIG. 1 shows system components and interfaces of an exemplary portable telecommunication system, $PTS_1$, which provides wideband code division multiple access (WCDMA) RAN and Core network functionality in a single system carried on mobile platform, although other air interfaces and radio network access technology such as Global Standard for Mobil (GSM) communication Base Station System (BSS), General Packet Radio Services (GPRS), enhanced data rates for GSM evolution (EDGE), code division multiple access (CDMA), Freedom of Mobile Multimedia Access (FOMA), CDMA2000 and TD-SCDMA may be used. $PTS_1$ may support circuit-switched voice/video calls and best-effort packet data calls. The components of a PTS system communicate over a LAN that is internal to the PTS system. The LAN is connected to a user provided router (not shown) that provides access to the IP WAN 100. Connectivity between the systems $PTS_1$ to $PTS_N$ may be provided over the IP WAN and WAN infrastructure.

The $PTS_1$ system includes a radio network controller (RNC) 110, such as a WCDMA RNC, which controls a NodeB 112 via an Iub interface. The RNC 110 is, among other things, in charge of call setup, quality-of-service handling, and management of the radio resources in the coverage area, or cell for which it is responsible. The RNC 110 provides the ability to setup the radio access bearers between UE 114 and a media gateway MGW 136 and uGSN 118. The RNC 110 of the portable system may be a pico-RNC configuration, which is reduced in size to operate with a single Node B. A pico-RNC supports the Iub (e.g., over T1/E1), Iu, Iur and Operation and Maintenance (O&M) subsystem (e.g., Mur over Ethernet) interfaces, and may include support for soft handover with other PTS systems using Iur over IP, and GPS interaction to retrieve the location and time of the PTS system.

The NodeB 112 represents a logical node responsible for physical-layer processing such as error correcting coding, modulation and spreading, as well as conversion from baseband to the radio frequency signal transmitted from the antenna. The NodeB 112 may handle transmission and reception in one or more cells. For example, NodeB 112 may provide WCDMA radio coverage and support existing Uu, Iub (e.g., ATM over T1/E1) and an O&M interface (e.g., Mub). NodeB Application Protocol (NBAP) may be supported for signaling between the RNC 110 and NodeB 112 over the Iub interface. In its physical implementation, the NodeB may be a Radio Base Station (RBS).

The GPS receiver 116 provides reference timing for the PTS RNC 110 and location (i.e., latitude and longitude) information. The GPS receiver 116 acts as the PTS timing reference for a Network Time Protocol (NTP) server, which may be located on the Core network board hosting the O&M entity, Node B timing may be recovered over the Iub and uGSN timing is recovered from the NTP server. The MGW 136 may recover its timing from the T1/E1 link to the RNC 110.

If a GPS receiver 116 is not attached to a PTS at startup, a PTS is unable to acquire GPS signal for a period of time, or a PTS loses the GPS signal, the RNC 110 may use an internal system oscillator as the timing source. Even in the absence of the GPS, the RNC oscillator may be stable enough to provide an adequate timing reference to a PTS system. However, an absolute timing reference such as GPS is preferable in a non-standalone operation because an absolute time value used to derive frame sequence numbers prevents significant differential of sequence numbers between two PTS systems for successful soft handover between the PTS systems.

Since PTS systems may intermittently be in contact with each other, global causal ordering needs to be imposed on database updates made at each system. This ensures that the databases remain consistent when two systems rejoin the community after a period of isolation. For example, a UE performs a location update at PTS system "A" time t. At time t+10, the same UE performs a location update at PTS system "B." If these two systems are not in contact at the time of the location updates, they will not exchange sequence numbers and synchronize their databases. If they later make contact, there is no way to know which system's record for the UE is the correct version. For this reason, GPS is used as a global clock and used to timestamp database updates and impose a causal ordering of database updates across the community.

The uGSN 118 provides core network Serving GPRS Support Node (SGSN) and Gateway GPRS Support Node (GGSN) packet-switched (PS) functionality for PTS operation. The uGSN supports Gom, Gn, Gi interfaces and the Gr interface to a Home Location Register (HLR) 120.

The HLR 120 is a database containing details of each UE subscriber that is authorized to use the Core network. The Authentication Center (AUC) 122 is a function to authenticate each subscriber that attempts to connect to the Core network. The subscriber database is synchronized across other PTS systems in a community. The HLR 120 interacts with a Mobile Switching Center Server (MSC-S) 128, uGSN 118 and the Inter-PTS protocols 124.

If the HLR lacks programmatic interfaces to allow the HLR Synchronization Manager to be notified when subscriber temporary data is modified due to UE signaling, data considered temporary in the HLR such as UE location information may not be discovered and distributed throughout the community for call processing. In the reverse direction, the HLR also may not allow temporary data discovered by various means to be directly inserted into a subscriber record through a direct interface. To accommodate these limitations, a PTS may include an HLR Redundancy Adaptor (HRA) (not shown) to form an interface between the HLR and the Inter-PTS protocols subsystem. This adaptation layer manages the HLR user interface to extract, add, delete or modify subscriber profiles on behalf of the inter-PTS protocols subsystem.

For example, the redundant HLR interface concept may be used to provide a mechanism by which temporary subscriber data can be extracted from and inserted into a PLEX HLR. The redundancy interface between PLEX HLRs may use MAP operations. Such an HLR Redundancy Adapter would be, as the name suggests, a conduit for subscriber information between the PLEX HLR and the PTS Synchronization Manager (PTS-SM) (described later in detail) and maintain no subscriber state; it would pass information between the PTS-SM and the PLEX HLR. It also would adapt the MAP interface at the PLEX HLR to the much simpler message notification interface of the PTS-SM and hide the details of the redundancy control state machine from the PTS-SM.

The Inter-PTS protocols (PTSP) 124 is a subsystem providing support for auto-discovery of new PTS systems joining a community, detecting when a PTS system leaves a community, and propagating PTS system information within a community. This set of protocols of the PTSP 124 may use a multicast group ID, which an operator may assign prior to deployment of the PTS, to send system information of a PTS to other PTS systems in the same community. The PTSP 124 may be implemented on its own board or a board shared with other subsystems, such as the O&M Entity 126.

The Inter-PTSP 124 is responsible for synchronization of system data such as subscriber and configuration information. For example, PTS systems exchange presence messages called KeepAlive (KA) messages. Each KA message contains a sequence number that is incremented each time the subscriber database in that PTS system is changed either due to operator action or due to over-the-air signaling from the UE. Recipients of a KA message may request updates when they see that the sender's database sequence number is different from the sequence number last seen.

With respect to the Inter-PTSP 124 exchanging configuration information, when a PTS system (e.g., $PTS_1$) starts seeing keep-alive messages from another PTS system (e.g., $PTS_2$), it may request and receive key configuration information from that other system. This information may include, for example, the IP addresses and SS7 routing information of the MSC, RNC and SGSN of the $PTS_2$ system. The routing information may be used to set up links, such as SS7 links between the peer RNCs, MSCs and SGSNs to allow UEs to roam from one PTS system to another and for soft handover between two RNCs.

The Inter-PTSP 124 also advertises PTS system capabilities. For example, the PTS system that is connected to the PSTN advertises the state of the connection in its KeepAlive messages. This allows the other PTS systems in the community to automatically configure their MSCs to route calls for the PSTN or mobile network to the gateway system.

The Inter-PTSP 124 also is responsible for providing a location information function. For example, the latitude and longitude of a PTS system may be continually updated in each Keep Alive message so other PTS systems may learn their relative separations and decide whether one system should shut off its radio transmitter to minimize inter-system interference.

The O&M entity 126 provides an overall operations and maintenance function for all components within a PTS system. The O&M may include an interface such as the HTTP/Telnet user interface shown in FIG. 1. The HTTP/Telnet interface may be used to initially provision a PTS system, including the system parameters and UE 114 information. The O&M entity 126 also may support an autonomous PTS system health monitoring function that correlates alarm notifications from the PTS system components, check connectivity between components, verify system resources and initiates component, and/or provide system recovery when failures are detected. The O&M entity 126 may be implemented, for example, on its own board or on a board that may be shared with other subsystems such as the Inter-PTS protocols 124.

The O&M entity 126 may include a web based user interface for the provisioning of subscriber records. The web interface may accept entering subscriber records individually or in bulk. An HTML form may be presented to the user where individual subscribers are entered. The subscriber record holds information such as International Mobile Subscriber Identity (IMSI), Mobile Station International ISDN Number (MSISDN) and subscriber key (Ki). The same HTML form also may allow for bulk provisioning by entering the path to a file with the subscriber entries. An entered list of subscriber records may be forwarded to the MSC/HLR via its O&M interface. The subscriber data also may be forwarded to the PTS Synchronization Manager (PTS-SM), which is described later herein in detail.

The O&M entity 126 may be centralized and/or distributed among the PTS components. For example, a central O&M may interface with a local O&M serving one or more components to configure those components. A local O&M also may centralize alarm reporting for all components on a board before reporting to the central O&M. The local O&M also may be responsible for starting and stopping component applications. A local O&M instance also may be used to manage components, such as a Short Message Service Center (SMSC) and Voicemail System (VMS). For example, a local O&M for the SMSC and VMS may present a uniform configuration and alarm reporting interface for the collocated components and be responsible for translating requests from the central O&M to the configuration protocol used by the SMSC and VMS.

In the FIG. 1 system, the Mobile Switching Center Server (MSC-S) 128 provides the circuit-switched (CS) call control and mobility functionality to subscribers roaming the area it serves. This may include, for example, voice, data, fax services, and Short Message Service (SMS) services.

The FIG. 1 system also includes an SMSC 130 that provides store and forward features for short messages. More specifically, the SMSC 130 is a node in the PTS system that receives short messages from its co-located MSC-S 128 or VMS and stores these messages until they can be delivered successfully to their destination through the target MSC-S 128. The SMSC 130 also may receive the configuration information needed to setup the connection with the local and the remote MSCs through the O&M 126. The SMSCs of all the PTS systems may use the same ISDN in the mobile and subscriber data, but each SMSC is configured with different point code in each PTS system for the MAP protocol. In this way, the MSC will always send the incoming SMS to the local SMSC. The UEs and the MSC-S should be provisioned accordingly.

The interface between the SMSC 130 and the HLR 120 uses the MAP protocol. The HLR 120 is used by the SMSC 130 to query the location of a mobile. Since the SMSC 130 can only reach its local HLR 120, the PTS protocol is used to propagate the mobile station's location information between all the HLRs of the community. A Message Waiting Data flag may be prevented from propagating to remote HLRs through the Inter-PTS protocols 124 so the HLR 120 will alert only the originating SMSC 130 holding a short message in its retention queue when a destination subscriber becomes reachable.

The interface between the SMSC 130 and the VMS 132 may use the SMPP protocol. A PTS VMS system can only reach its local SMSC 130.

The SMS-C 128 is a store-and-forward type of messaging server system, which means that the server will accept and store a message on behalf of the originator and at a later time attempt to deliver the message to the recipient(s). In contrast to SMS-Relay based service centers, where a relay simply conveys the message while the originator is sending the message and does not at any time store it locally, the SMSC 130 may always store before attempting to deliver the message. For this purpose, the SMSC 130 may include a set of different queues to take care of delivery attempts and retry patterns for various network conditions. These queues may be implemented as two separate queues: a retry queue having three tiers, each with its own timer and intervals; and a retention queue for destinations that are not reachable. For example, the short message may be first inserted into the retry queue. If the message cannot be delivered even after trying repeatedly for the configurable number of attempts, the message is moved to the retention queue, which will try again but less frequently. The message expiry time may be checked when moving from one stage to another, and the message discarded if it is too old.

A VMS 132 provides a distributed voice mail feature for the PTS system. Subscribers can access voice mails at any PTS system, although the voice mails for a particular subscriber are not necessarily aggregated into any one PTS system.

In a distributed VMS implementation, messages for a subscriber may be stored on multiple PTS systems. Even if one or more PTS systems fail in a distributed implementation, the community as a whole still may provide voice mail functionality (i.e., only those messages stored on the failed PTS systems will be lost). A subscriber may be notified via SMS of the short code to be dialed to retrieve messages from a particular PTS system.

Voice mails are generally stored in the PTS system where the subscriber is currently registered, or in the case of CFU (call forwarding, unconditional), in the originating PTS system. In either case, a recipient will receive a short message notification containing the voicemail server's short digit code to dial to retrieve the recipient's voicemail. Each VMS 132 may be assigned a short digit code, which is unique within the PTS community. Therefore, to retrieve a voicemail, the subscriber would dial the number of the VMS 132 that stored the message, and it may be a different number for each voice message.

The VMS functions are provided by three main components: a VMS core, storage, and a local O&M subsystem. The VMS core manages the deposit, storage and retrieval of messages. BICC over SIGTRAN may be used to interface with the MSC-S 128 for the call control messages while Nb/RTP may be used towards the MGW 136 to transport the voice bearer. When a message is deposited, the SMPP interface towards the SMSC is used to notify the subscriber of the availability of the voice mail message. The core also ages and purges stale messages on message expiry. Storage manages a FLASH drive on behalf of the VMS to store voice mail messages as individual files within a file system. It provides a uniform application programming interface (API) to hide caching and disk details from the application. A local O&M subsystem may be used to configure the VMS 132, report and clear alarms and manage log files for error investigation.

FIG. 1 also shows a Group Call Node (GCN) 134 that provides a group-calling feature by utilizing MSC and HLR support for IN services. The GCN feature allows subscribers to dial a single number to automatically page several subscribers and join their traffic streams into a conference call. The Mobile Station International ISDN Number (MSISDN) that is dialed to setup the conference call (pilot MSISDN) and the member MSISDNs would be configured in advance on at least one PTS system. The GCN 134 may interface with a local O&M (e.g., via a CS1+ interface) for the configuration of call groups, the MSC-S 128 for the setup/supervision/release of group calls, and the PTS collective network for group call status updates of the entire collective. A local O&M serving the GCN 134 may handle the creation, modification, retrieval, and deletion of call groups and members.

The MGW 136 provides payload processing for CS calls. It also provides trans-coding resources for calls between the PTS UEs and the PSTN. The MGW 136 delivers the ISDN D-channel to the MSC-S 128 using IUA over IP. Similar to the RNC 110, the MGW 136 of a PTS may be a standard component, such as a GSM/WCDMA MGW, scaled down to a number of boards sufficient for use in a PTS application (e.g., a "pico-MGW").

The $PTS_1$ system is connected to the external IP WAN 100 and supports UE-to-UE traffic within the same system, and UE to the trusted PSTN calls (and vice versa). The $PTS_1$ system and other PTS systems (e.g., $PTS_2$ to $PTS_N$) may be added to form a community with IP-based interconnectivity to support user mobility across cell boundaries. The community operates in a dynamic environment where individual PTS systems may join or leave a community at any time, and because a PTS provides a mobile canopy of coverage, the physical proximity between systems can change continuously. The protocols of the PTSP subsystem are used to disseminate information about PTS systems throughout the community and to trigger automatic configuration of signaling links (e.g., RNSAP, MAP etc.) between peer PTS systems (inter-RNC, inter-SGSN, inter-MSC) without operator involvement.

Figure 2:
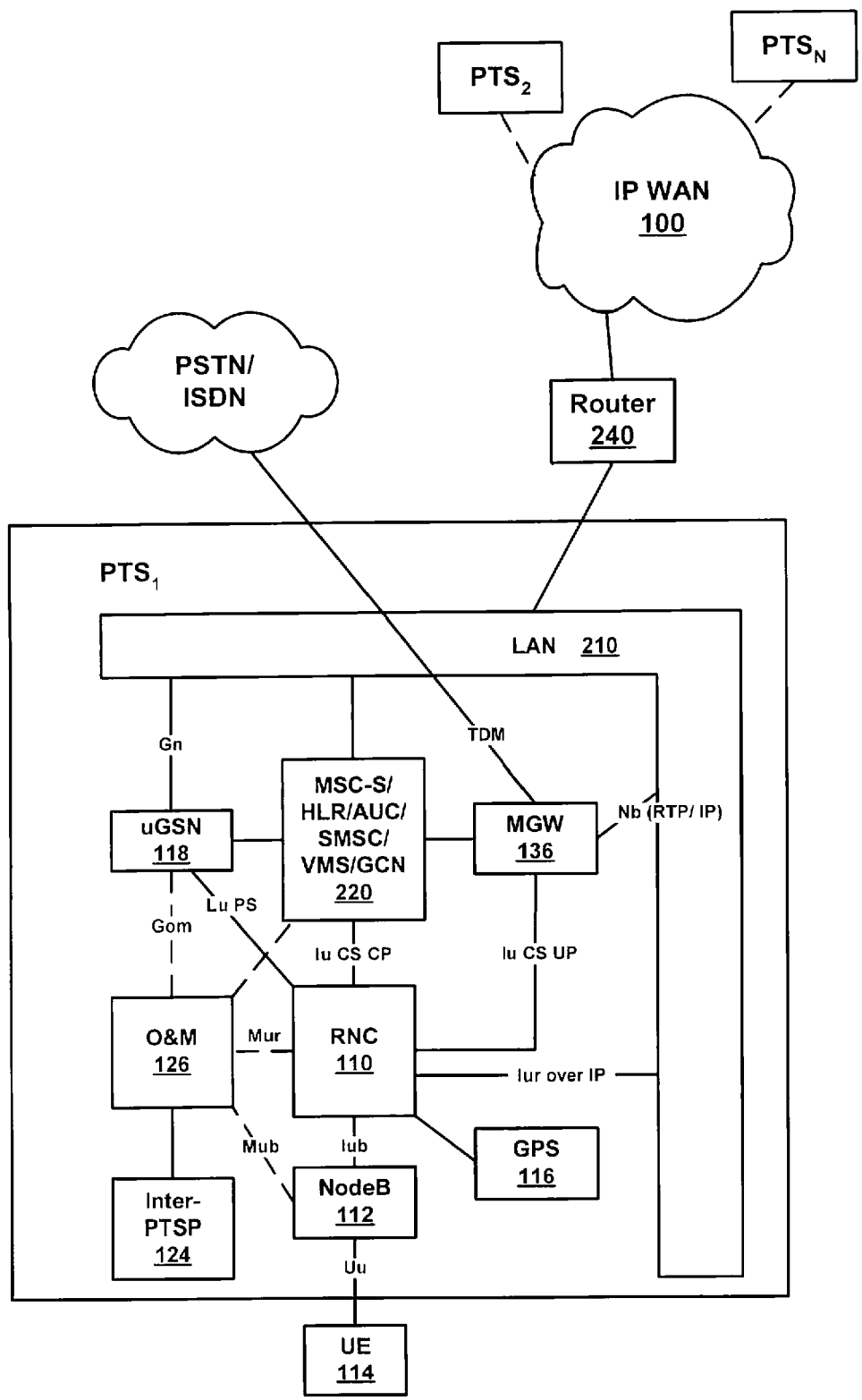
FIG. 2 is a diagram representing exemplary network architecture of a PTS node connected to a network in accordance with exemplary embodiments.

FIG. 2 shows exemplary network architecture of PTS system components and interfaces (logical interfaces are shown by dashed lines). In FIG. 2, the $PTS_1$ components communicate over a LAN 210, which may include, for example, an Ethernet switch (e.g., an L2 Ethernet Switch). The LAN 210 also provides system connectivity via a router 240, which may be provided external to the PTS, to an IP WAN 100 and one or more other PTS systems (e.g., PTS$_2$ to PTS$_N$). Each PTS system includes both access and core network elements in a one-to-one relationship, and may be configured as a single location and routing area. The access network includes the NodeB 112 and RNC 110, while the core network includes the uGSN 118, MGW 136, MSC-S/HLR/AUC/SMSC/VMS/GCN 220.

It is to be appreciated that the grouping of components in FIG. 2 is exemplary, for example, the SMSC and VMS, as well as other PTS components, may be provided on a separate board from the MSC-S, HLR, AUC and GCN components or grouped appropriately within a PTS. For example, the NodeB 112, RNC 110, and MGW 136 may be implemented as separate nodes, while Inter-PTSP/PTS-SM/O&M, GSN 118, MSC-S/HLR/AUC/GCN and SMSC/VMS components may be implemented on common boards.

As shown in FIG. 2, a PTS community may include two or more PTS systems connected via the IP WAN 100. The community defines the systems that support soft and hard-handover of UEs. Each PTS HLR stores the subscriber profiles in a database and the database contents may be synchronized within a community so that failure of one PTS does not prevent a subscriber from obtaining service from other members in the community.

Each PTS automatically detects the other members of the community, exchanges information, and auto-configures itself with neighbor cell relation information and sets up signaling links between systems via the Inter-PTSP 124. For example, when PTS$_1$ is connected to the IP WAN 100, it broadcasts its presence to the other PTS systems as identified by the pre-assigned multicast group ID. The subscriber information contained in the new PTS$_1$ HLR 120 is disseminated and synchronized across other PTS systems within the community to support user mobility. Likewise, HLR information from PTS systems in the community may be added to the HLR 120 of the joining PTS$_1$ by the protocols of the functions carried out by the Inter-PTSP 124 and O&M 126. The Inter-PTSP 124 also may be responsible for dissemination of group call membership information and GCN status.

The Inter-PTSP 124 subsystem provides a way for a PTS system to communicate and exchange information over the IP WAN 100 with other PTS systems in a community. Two general classes of information are accommodated: multicast packets (e.g., KeepAlive presence messages) and peer-to-peer data exchanges (e.g., either messages or files). A PTS Protocol Manager (PTSPM) sets up these communications channels, manages exchanges between PTS systems, and passes the data to or from internal system nodes. It also performs key oversight functions, such as signaling to other systems that a local PTS is joining or leaving the community, keeping track of which other PTS systems are in the community and active, and determining when data needs to be exchanged between PTS systems.

Each PTS system in a community has a unique PTS MAC identifier (address), and upon provisioning will be assigned key parameters such as a PTS ID and multicast group. At startup, the system will subscribe to the pre-assigned multicast group using a multicast mechanism, for example, standard IPv4 multicast mechanisms (e.g., IGMP/MLD). After subscription to the multi-cast group, the system will advertise its presence in the community using KeepAlive (KA) presence messages. This KA message is sent initially to join a community and is also sent periodically to maintain community membership and/or detect changes in the community topology.

Figure 3A:
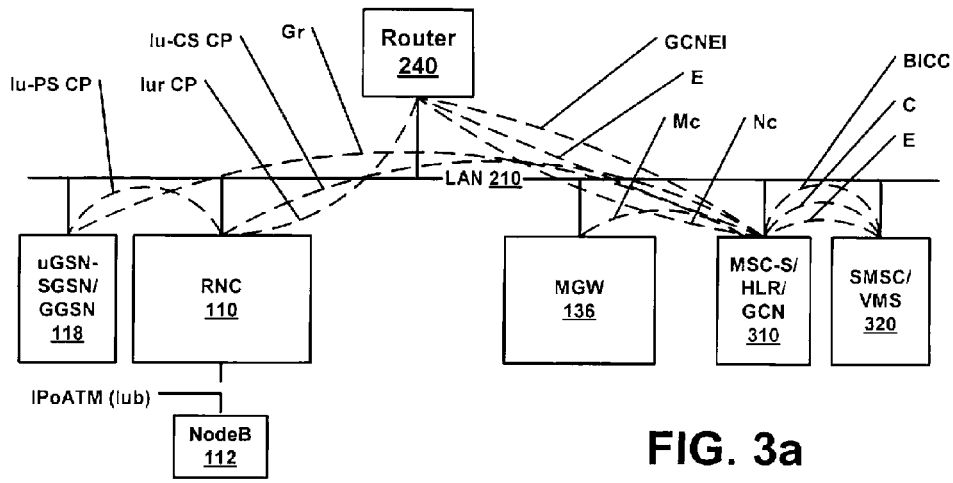
FIG. 3a is a diagram representing control plane routing among exemplary PTS system components.
Figure 3B:
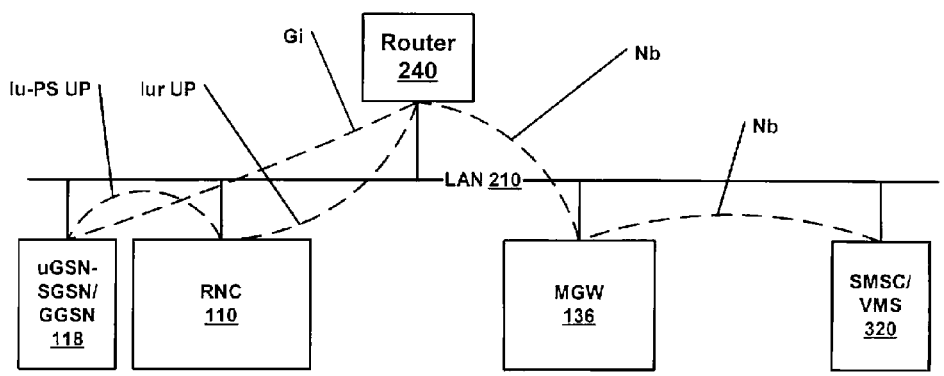
FIG. 3b is a diagram representing user plane routing among exemplary PTS system components.
Figure 3C:
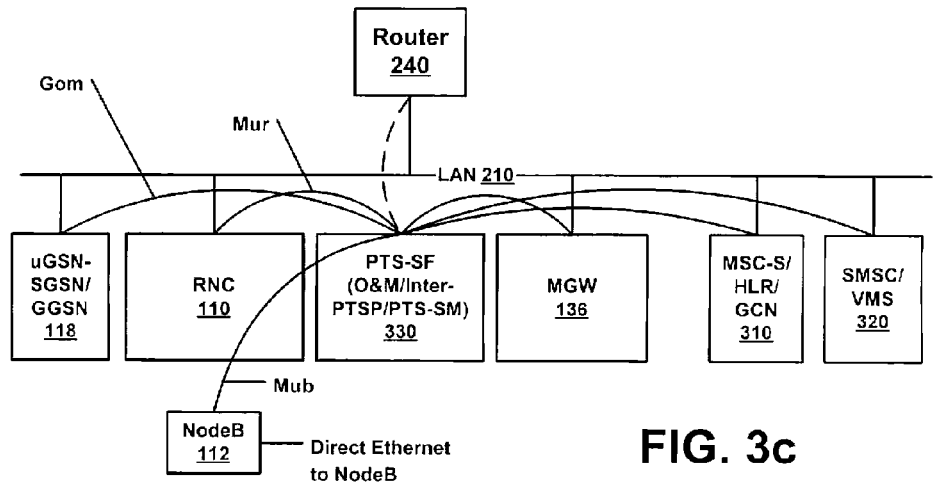
FIG. 3c is a diagram representing O&M and Inter PTS Protocol plane routing among exemplary PTS system components.

FIGS. 3a-3c are diagrams respectively showing more detail of exemplary control plane, user plane, and O&M and Inter-PTSP IP interfaces within PTS components according to some embodiments. In these embodiments, the MSC/HLR/GCN function is implemented on one board 310, and the SMSC/VMS functions are implemented on another separate board or module 320. Additionally, FIG. 3c shows the O&M, Inter-PTSP and PTS-SM together on a PTS-SF (PTS Special Functions) board 330.

In FIG. 3a, the IP traffic exchanged within and across PTS systems and components comprises the following traffic flows: the Iu-PS Control Plane (CP) supports Iu-PS signaling traffic flows between the SGSN 118 and the RNC 110; the Iu-PS CP traffic is routed between the two Ethernet interfaces on the local LAN 210; the Iur CP is an Iur signaling path of traffic originating in RNC 110, the WAN router 240, and an RNC in another PTS; Iu-CS CP handles the Iu-CS control plane messages flow between the RNC 110 and the MSC-S 310, and is routed between two Ethernet interfaces on the local LAN 210; the Gr interface exchanges UE location information between the SGSN 118 and the HLR 310; GCNEI is an interface for Group call data between the GCN 310 and a GCN on another PTS and routed over a WAN via the router 240; the E interface is used for delivery of originating SMS between MSC-S 310 and SMSC 310, and delivery of terminating SMS to external an MSC routed over the WAN via the router 240; the Mc interface handles resource sharing and allocation of PTS MGW resources controlled by MSC-S 310; the Nc interface handles Network-to-Network call control over ISUP or BICC between the MSC-S 310 and an MSC of another PTS and is routed over the WAN; C is an interface for interrogation of subscriber by the HLR 310 on request from SMSC 320 to obtain routing information for SMS delivery; and the Iub interface handles NBAP control signaling over IP over ATM.

In FIG. 3b, the Iu-PS User Plane (UP) handles user traffic flows between the SGSN 118 and the RNC 110. The traffic is routed between the two Ethernet interfaces on the LAN 210. The Iur UP user path involves the RNC 110, the WAN router 240 and an RNC of another PTS system. The traffic originates from a special processor board (SPB) in the RNC 110 and reaches a SPB in the other RNC. Nb transports user data over real-time transport protocol (RTP) between the MGW 136 and a gateway of another PTS routed over the WAN. Nb also transports voicemails between the MGW 136 and the VMS 320.

FIG. 3c illustrates point to multi-point connection (solid line paths) between central O&M in PTS-SF 330 to the local O&M functions in the PTS components. The Inter-PTSP interface (shown as a dashed path) uses IP multicasting to broadcast information such as UE information, system status information etc, over the WAN to other PTS systems in the community. In addition to the Mub interface which routes traffic of the O&M 330 to the NodeB 112 via the RNC 110, the NodeB 112 also may have a direct Ethernet to Ethernet (E2E) interface.

Figure 4:
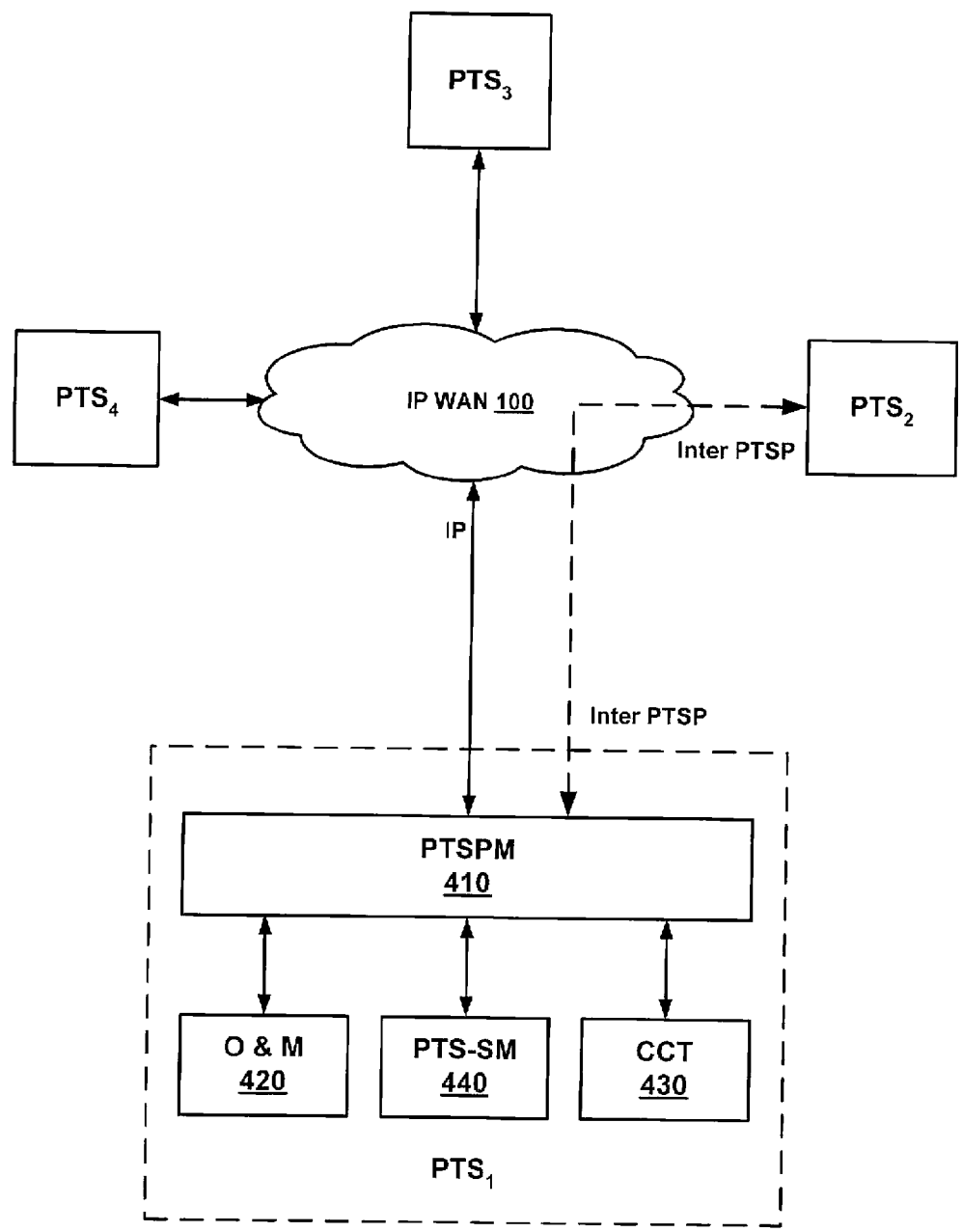
FIG. 4 illustrates system components implementing Inter-PTS protocols in a network of four PTS systems in accordance with some embodiments.

FIG. 4 is a diagram of system components implementing PTSP in an exemplary network community including four PTS systems. As shown in FIG. 4, the PTSPM 410 interacts with an O&M entity 420 within the PTS$_1$ system to obtain configuration parameters (e.g., frequency, scrambling code, etc.), and propagates community member's parameters (e.g., RAN parameters, IP address, etc.) learned about other PTS systems in the community. Published configuration information about other systems in the community is maintained in a Community Configuration Table (CCT) 430, which is continually updated based on the detection of periodic KA messages.

The PTSPM 410 also may exchange subscriber information with other community members to ensure each PTS has up-to-date information about every subscriber in the community, which enables proper routing of call setup messages and other network services. In the FIG. 4 embodiment, each PTS system has a PTS Synchronization Manager (PTS-SM) 440 that manages subscriber information and exchanges updates via PTSP message fields over the WAN with other PTS members, as represented by the exemplary "Inter PTSP" data path between $PTS_1$ and $PTS_2$.

The PTS-SM 440 function enables the extraction and insertion of information into each PTS's HLR. It bridges the O&M 420, PTSP and HLR functions and acts as an intermediary between the HLR and PTSP for data extraction and insertion when exchanging data between PTS systems to support PTS community operation. This design minimizes HLR impacts by using a simple messaging protocol to the HLR and making PTS-specific operational details transparent to the HLR operation. The PTS-SM 440 also may support a robust and persistent mechanism to re-populate the HLR at system restarts, thereby avoiding costly and time consuming HLR (and MSC) save dump operations. The PTS-SM 440 interface to the PTSP may be flexible to allow feature extensions related to customer deployments. The PTS-SM 440 also may provide the capability to resolve conflicts between data received (via the PTSP) from different PTS systems. The PTS-SM 440 may provide similar functionality for group call lists, acting as the intermediary between PTSP and O&M 420 to pass group call data learned from the community to the GCN and vice versa. The PTS-SF may be hosted on a board separate from the uGSN, MSC and SMSC/VMS, although other board configurations may be used.

The PTS-SM 440 manages permanent or static subscriber data, which may include subscriber data supplied by the operator including IMSI, MSISDN, Ki and possibly the subscriber profile ID, and Group Call membership lists (also permanent data though they are not provisioned in the HLR). The PTS-SM 440 also manages temporary or dynamic data, such as fields updated due to subscriber action such as the PTS system serving the UE (e.g., MSC/VLR numbers) and supplementary service state (e.g., call forwarding activated, call forwarding number etc.)

The O&M entity 420 may forward subscriber data to the PTS-SM and MSC/HLR via O&M interfaces to ensure persistent storage and broadcast of subscriber data to the community. Subscribers may be deleted individually or in bulk in the much the same manner as they are added except that the IMSI may suffice to identify the subscriber. For example, deleting an IMSI at one PTS system may cause that IMSI to be automatically deleted from all other PTS systems in the community via the inter-PTSP.

Presence Messages

A KeepAlive (KA) message is a message sent by the PTSPM over PTSP to any other system(s) that might be listening to the same IP multicast group. It advertises the presence and state of a PTS and contains fields including state information about the sending system, such as the operator configured system identifier, the PTS-MAC address of the sending system, protocol version, timestamp, state of the RAN (radiating, wilted, reduced power), state of the GPS, location information (latitude, longitude, elevation), system capabilities (connected to PSTN) etc. The KA message also includes a configuration sequence number (CSN) that may alert listeners that some part of the sender's configuration has changed. The listening PTS systems may request the updated configuration from the sender of the KA message based on the value of the CSN field contained in the received KA.

A KA message also has a field for a PTS-SM DB Sequence Number Vector (SNV) of a given system, which may include Sequence Number (SN)/PTS-ID pair for each PTS represented in a sending PTS's database. The SN is a value representing the version of the records stored for a PTS in the sending PTS. When a change occurs in the data for one of the subscribers attached to a PTS sending a KA, the PTS-SM may signal the PTSPM to increment its database version number in the PTS-SM SNV that is sent. Table 1 contains an exemplary set of parameters and fields that may be contained in a PTSP KA message:

TABLE 1

| Parameter Name | Description |
| --- | --- |
| Length | Length of this KeepAlive message in bytes. |
| PTS-MAC | This is the Ethernet MAC-48 address from a PTS core board. It is a guaranteed unique identity for PTS systems. |
| PTS-ID | 1 to 255. Identifies a PTS within a Community. This is operator-assigned. PTS system Configuration parameters are derived from this parameter. (E.g. scrambling code, IP network, etc.). |
| IP Address | PTS Special Function board's public IPv4 address of the community member. |
| PTSP version | Version of the PTS protocol. Structured as XX.YY where X is major release version and Y is minor release. Changes to PTSP that impact compatibility with other previous released versions will increment the major version. |
| Timestamp | UTC date/time. Format: YYYY-MM-DD HH:MM:SS where HH is based on a 24-hour clock. This is the date and time when the KeepAlive message was sent by this PTS system. |
| Position | GPS Latitude, Longitude, Altitude. |
| Radio Status List | Values: Wilted/Blossomed/Reduced Power for each of 2 channels. Current radio state of the PTS System FAs. List is max of 2. |
| Time Lock | Values: This PTS is or is not synchronized to common community time. |
| PSTN Connectivity | Logical 1 indicates this PTS is communicating with PSTN and is acting as PSTN Gateway. |
| GCN Status | Logical 1 indicates that Group Call Node in this PTS system is available. |
| PTS-SM SNV | PTS-SM Data Base (DB) Sequence Number Vector. One pair of numbers for each PTS that is represented in the sending PTS database. One number in each pair is the PTS-ID, and its mate is the Sequence Number of the current data version that the sender has for that PTS-ID. The vector must contain at a minimum the sender's PTS-ID/Sequence Number pair. A received Sequence Number that is lower than that stored in the CCT is considered invalid, triggering full data exchange (i.e., full PYS-SM data base information). |
| CSN | Configuration Sequence Number, giving the version of the sending PTS system's configuration information. A received Sequence Number that is lower than that stored in the CCT is considered invalid, triggering a ConfigReq message. |

A PTS system may send a PTSP KA message to its multicast group every $T_{KeepAlive}$ timeout period. The community can detect a failure of a system by the absence of its KA messages. After a period of time elapses, which may be defined by a purging timer $T_{PurgeConfig}$, the PTSPM of a PTS may notify the O&M to purge dynamic configuration data and remove communication links to the PTS associated with the timeout. A $T_{PurgeConfig}$ timeout period would typically exceed the $T_{KeepAlive}$ timeout period, for example, by an amount greater than several times the $T_{KeepAlive}$ period.

To avoid possible bursts of KA messages over the WAN from multiple PTS systems, the start time of these periodic transmissions maybe staggered based on a scheme, such a staggering based on the PTS-MAC addresses of the systems.

Configuration Synchronization

Configuration synchronization is needed to establish the appropriate connections and relationships between PTS systems in a community. The PTS systems participating in a community exchange configuration parameters upon joining a community as well as after a change to a configuration parameter. Each PTS system in the community maintains a CCT having an entry with configuration data for each detected community member. New entries are established when detecting a new PTS-MAC or PTS-ID in a received KA message. When a PTS detects a change in the CCT parameters, the parameters are updated for the corresponding entry of the PTS that sent the KA message. Some community table parameter changes (e.g., PTS-ID or UMTS Absolute Radio Frequency Channel Number (UARFCN) changes) may trigger O&M actions.

Whenever configuration information of a PTS changes, its CSN is incremented and is sent in the next KA message so that other community members can request the current configuration (e.g., via a ConfigReq message). Table 2 lists exemplary parameters that may be stored in the CCT for each PTS:

TABLE 2

| | |
|---|---|
| PTS-MAC | The Ethernet MAC-48 address from a PTS core board. It is a guaranteed unique identity for PTS systems. |
| PTS-ID | 1 to 255. Identifies a PTS system's configuration. PTS system configuration parameters are derived from this parameter. (E.g. scrambling code, IP network etc.) |
| IP address | IPv4 address of the community member. |
| PTSP version | Version of the PTS Protocol. May be structured as XX.YY where X is major release version and Y is minor release. Changes to PTSP that impact compatibility with other previous released versions will increment the major version. |
| DB version | Schema version of the PTS-SM Data Base. |
| Timestamp | UTC date/time. Format: YYYY-MM-DD HH:MM:SS where HH is based on a 24-hour clock. This is the date and time when the last KA message was received from this PTS system. |
| Configuration Sequence Number (CSN) | Gives current version number of the PTS configuration data. The maximum value is large enough to avoid frequent rollover. |
| PTS-SM Sequence Number Vector (SNV) | Compare to SNV in latest KA message to see if new PTS-SM DB information is available |
| UARFCN List | Integer 0 to 16383 giving UTRAN absolute radio frequency channel(s). This is the WCDMA channel number, which also implies the Band. List shall have up to 2 entries. |
| Position | GPS Latitude and Longitude to 50 m resolution (approx. 1.5 arcsecond), Altitude to 50 m resolution |
| Availability Status | Values: (Available and Unavailable). Used by PTSPM to keep track of who in the community is active. This field will be changed to unavailable if a KA message has not been received within the specified time interval. |
| Radio Status List | Wilted/Blossomed/Reduced power. Current radio state of the PTS System FAs. List is max of 2. |
| Group Call Node Status | Values: (Available and Unavailable). Indicates status of GCN for this PTS system |
| Time Sync | Indicates that PTS is locked to common community time reference. This may be redundant with GPS Lock in systems that use GPS for timing. |
| GPS Lock | Logical 1 indicates that this PTS system is locked to the GPS |
| Proximity Detection ON | Logical 1 indicates that this PTS system has enabled Proximity Detection |
| PSTN Gateway | Logical 1 indicates that the connection of this PTS to the PSTN is operational |
| Reserved bits | For future use (e.g., voicemail, ping time, etc.) |

The CCT is stored persistently in a PTS. On a system restart, each PTS record in the table shall be marked as unavailable until a KA message is detected from the corresponding community member. Community members that have not been re-detected in the community will be removed from the configuration table, as will be described herein in detail.

Data Synchronization

Accurate and timely data synchronization across the community determines performance of network-level functions and features. In the decentralized architecture used by the PTS system, the PTSPM accomplishes subscriber data synchronization by exchanging database (DB) records with other PTS systems. The PTS-SM data stored in each system includes a PTS MAC address along with other key subscriber attributes such as IMSI, user key K and a timestamp showing when the sending PTS established this record. The timestamp allows a PTS-SM to consistently identify the most recent record updates. When all community databases are synchronized, each PTS will know the routing to reach every subscriber.

Full data record information may be exchanged with other community members, for example, when a PTS joins a community. Following this initial update, delta changes (additions, deletions and modifications) may be communicated, as will be described later in detail. Changes may be sent by peer-to-peer (P2P) request, rather than by multicasting when they occur. This prevents the problem that a PTS could miss changes that are broadcast only once. Instead, a PTS system that misses a broadcast KA but comes back into communication will eventually hear another KA, see that the data version has changed, and request the changes.

To facilitate efficient data transfers and to minimize signaling traffic over the WAN, a PTS-SM data base Sequence Number Vector (SNV) is stored in the CCT. The PTSNV lists the highest sequence number for the data of each PTS represented in the database, or in other words, it indicates the freshness of the subscriber information that a PTS has about each community member. The PTS SNV is advertised to the community via the KA message. Community members compare the multicast PTSNV to the one stored in their CCT, and request an update if newer data are available.

The PTSPM passes new data to the PTS-SM subsystem, which compares individual records to those stored in the PTS-SM DB and updates old ones based on timestamps. The PTSPM also may obtain data records from the PTS-SM when it needs to fulfill a request from another PTS for information.

Figure 5:
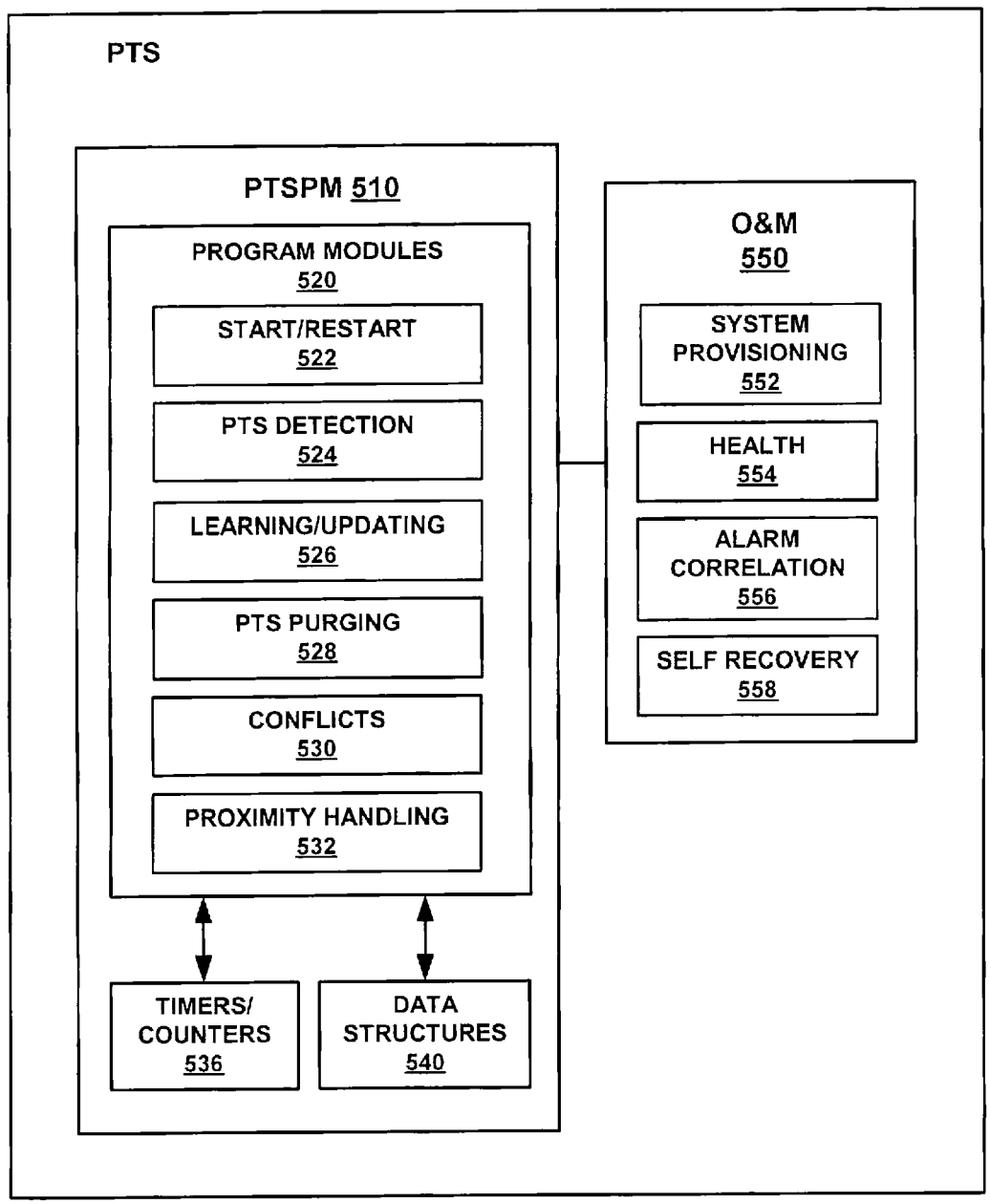
FIG. 5 is a block diagram of exemplary PTS Program Manager and O&M program modules in accordance with some embodiments.

FIG. 5 is a high-level block diagram representing modules of exemplary PTS protocol. In FIG. 5, the PTS Program Manager (PTSPM) 510 controls program modules 520 stored in storage and/or memory of a PTS system. Each program modules may use timers/counters 536 and data structures 540 to perform initialization, discovery and updates of peer PTS systems present on a network, and include one or more procedures to carry out these tasks.

The PTSPM 510 enables the peers to automatically discover one another in a network a with limited initial configuration data. The protocols include a start/restart module 522, a PTS detection module 524, a learning/updating module 526, a purging module 528, a conflicts module 530, and a proximity handling module 532. While the program modules 520 are depicted as separate processes, some embodiments may merge some or all of the tasks performed by the various modules. For example, some or all of the processes performed by the PTS detection module 524 and the PTS purging module 528 may be merged background processes performed while other program processes related to PTS connections are running. Also, some tasks performed within a single depicted module may be performed as several separate modules. For example, the learning/updating module 526 can be viewed as including several tasks that may be performed independently, but may logically be viewed as a single process with some receive queue, timeout events and regular processing. The PTS purging module 528 may have separate procedures for announced and unannounced PTS departures from the network.

Also shown in FIG. 5 is an exemplary Operations and Maintenance (O&M) function 550 having modules for system provisioning 552, health monitoring 554, alarm correlation 556 and self-recovery 558. The O&M may be integrated with the discovery protocol 510 to implement community features. For example, the O&M function 550 may control the entire PTS system and present a simplified and integrated management view of the system to an operator. An operator does not necessarily have to configure each component of an individual PTS system to bring the system into service.

In some embodiments, an O&M function 550 may keep components of a standard core network oblivious of the special features of a PTS system. For example, a PTS system may include a HLR that is kept unaware of the fact that its contents are replicated in all the PTS systems in the community. Actions of the O&M function 550 may be used to extract the HLR contents, distribute them, and add profiles learned from other peer PTS systems. The HLR may not distinguish these software-initiated actions from operator-initiated actions.

The discovery protocol modules 520 make use of data structures 540 (e.g., CCT, subscriber data in DB, SNVs, CSNs etc.), and a plurality of timers and/or counters 536 (e.g., $T_{KeepAlive}$, $T_{PurgeConfig}$, $T_{fullDBexchange}$, iteration counters etc.).

Figure 6:
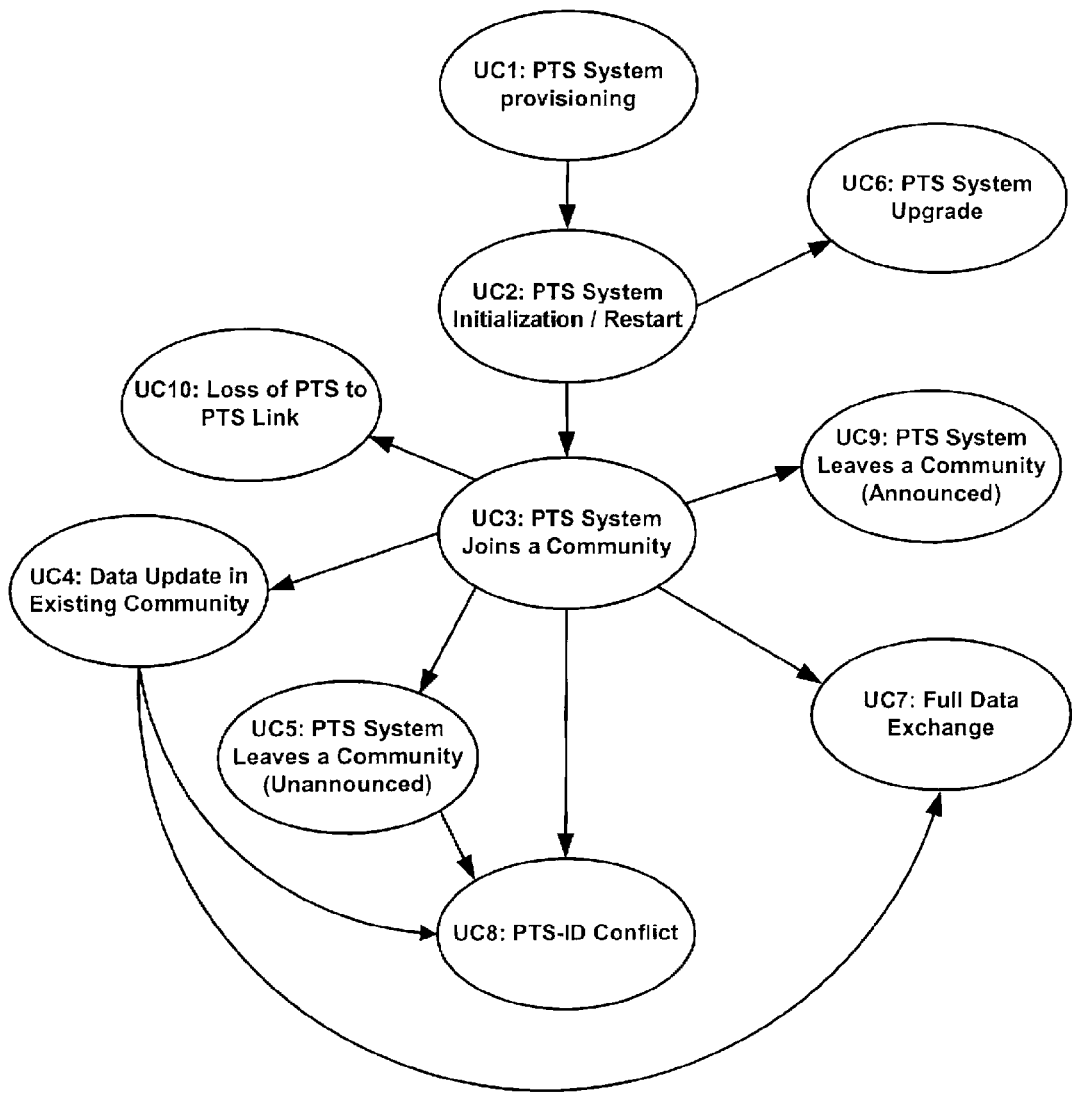
FIG. 6 is a use case map of Inter-PTS Protocol illustrating exemplary use cases and use case dependencies in accordance with some embodiments.

FIG. 6 is a use case map (UC) illustrating procedures carried out by the program modules 520 and O&M modules 550 according to some embodiments. The use cases UC1-UC10 depicted in FIG. 6 illustrate various scenarios that may be encountered by PTS systems. UC1 corresponds to a procedure carried out by the O&M system provisioning module 552; UC2 2 corresponds to the start/restart module 522; UC3 corresponds to the PTS detection module 524; UC4, UC6 and UC7 correspond to the learning/updating module 526; UC5, UC9 and UC10 correspond to the PTS purging module 528; and UC8 corresponds to the conflicts module 530.

In any UC where a configuration update is received, the full update must be received without data link errors, and the data must be successfully stored in the CCT, before the CSN is updated and operation continues. Similarly, in any UC where updated subscriber information is received, the full update must be received without data link errors, and the data successfully stored, before the PTSNV is updated and operation continues. Otherwise, these use cases would fail and the status would return to the previous state.

UC1: PTS System Provisioning

PTS system provisioning may be accomplished with minimal input from the operator. For instance, attributes that can only be provided by the operator may be requested, such as transmit frequency (UARFCN for the uplink and downlink), IP address ranges, multicast group address etc. All other parameters needed for PTS operation may be pre-configured during software installation, derived from the operator provided values, and/or learned from other PTS systems in the community.

A configuration management function in a PTS system manages the user interface towards the operator for entering configuration parameters during system provisioning and propagates derived configuration into the affected components. Dynamic configuration may be performed during operation when other systems enter or leave the PTS community and may include configuration of traffic and signaling interfaces towards those systems for mobility and call processing. The configuration management function is also responsible for providing the user interface for provisioning of subscribers and group calls and distributes those to other subsystems. The user interface may be a local Thin Client, for example, a standard Windows™ PC with web browser.

For example, a web browser may connect to the PTS system via the PTS LAN switch using the factory configured IPv4 address (e.g., an IPv4 address) on the O&M board (e.g., a PTS-SF board). Range/unit/format checking may be performed at time of entry and before any propagation of data to the system components. An attribute definition containing the necessary properties, for example, a PTS Management Object Model (MOM), may be provided in a stored object for the O&M to carry out these checks. A consistency check also may be performed for each user provided parameter (e.g. UMTS rules for UL/DL RF channel separation may be enforced). The user interface through the web client may expose attributes on the PTS Management Object (MO) and the user-provided attributes for system provisioning may be modeled on this MO. These attributes may be the only public attributes exposed outside PTS. Table 3 illustrates an exemplary set of configuration parameters that may be provided by an operator.

TABLE 3

PTS Operator Provided Parameters

| Attribute Name | Description | Granularity |
|---|---|---|
| Network Prefix | Global IP network ID prefix assigned to each PTS system for external signaling interfaces. | N/A |
| Multicast Address IP | Multicast group address assigned to each PTS community. Unique to each PTS community. | N/A |
| UE Network Prefix | Global IP network prefix for allocation of UE address pool. Must be different from Network Prefix. | N/A |
| PDN Gateway | Default gateway IP address for the Gi interface reference point from GGSN to the public external packet data network. | N/A |
| DNS Server Address | Address of DNS server in customer's Packet Data Network to be sent to UE. Provisioned in GGSN. | Yes |
| PTS-ID | ID assigned to PTS system within a community. Unique only within the community. Valid range is 1-254. Value 0 is reserved and 255 is default value. | 1 |
| PLMN ID | Public Land Mobile Network (PLMN) ID constructed by concatenating the fields MCC and MNC. Unique to each PTS community. | N/A |
| UARFCN DL | UTRAN absolute RF channel number for DL according | Enum |

TABLE 3-continued

PTS Operator Provided Parameters

| Attribute Name | Description | Granularity |
| --- | --- | --- |
| | to UTRAN 3GPP spec TS 25.104. | |
| UARFCN UL | UTRAN absolute RF channel number for UL according to UTRAN 3GPP spec TS 25.104. | Enum |
| PSTN TDM | Physical transport network connection to the PSTN. This parameter also determines line coding and SS7 standard, i.e. ITU or ANSI (China). | Enum "E1" or "T1" |
| PSTN SLT | PSTN signaling time slot. The time slot on E1 or T1 used for signaling by the PSTN. | T1: 1-24<br>E1: 1-31 |
| PSTN PC | PSTN point code in ANSI (China) or ITU-T format, i.e. 3-8-3 (ITU) or 8-8-8 (ANSI and China). Format determined by PSTN TDM parameter. | N/A |
| PSTN ISUP | ISUP standard used by PSTN. ISUPTTC (Japan) is supported by the individual components but is not supported by the PTS system as TTC does not use NI and requires public point codes. | Enum with the following valid types:<br>ISUPDE (German)<br>ISUPIS (Israel/France)<br>ISUPCN (China)<br>ISUP4 (ITU)<br>ISUP5A (ANSI)<br>ISUP5B (ANSI) |
| MSC PC | Point Code of the MSC conforming to the PSTN network indicator. | |
| MGW PC | Point Code of the MGW conforming to the PSTN network indicator. | |
| Network Indicator | SS7 NI of the PSTN endpoint (defaults to National). | 0 (International), 1 (International Spare), 2 (National), 3 (National Spare) |
| MSISDN Series | Range of MSISDNs supported by the network. Must be configured in the MSC's B-series table. | |
| IMSI Series | Range of IMSIs to be supported by network. Must be configured in MSC and SGSN IMSI-series table. | |
| PH Function ON/OFF | Boolean value that allows the customer to enable or disable the function. "ON" is the default value. | |
| PH Distance Threshold | Distance comparison used between two PTS systems. Valid range is 1-65535, integer. Measured in meters, 100 meters is default value. | |
| PH Number of Sequential Positive Indications | Number of sequential times the function must detect two PTS systems are operating within or less than the Proximity Distance. The unit of measure is "KeepAlive" messages. The valid range is 1-255, integer. The default value is 3. | |
| PH Number of Sequential Negative Indications | Number of sequential times the function must detect two PTS systems are operating beyond or exceeding the Proximity Distance. The unit of measure is "KeepAlive" messages. The valid range is 1-255, integer. The default value is 3. | |

The PTS MOM may contain several objects for management (MOs) of the internal PTS components. The management interfaces and functionality for the internal components may be implemented on the resource object (RO) level as part of respective MO. The RO implementations may be used for interfacing the system components in regards to configuration fault management, performance management and software management.

In order to keep track of and maintain all configuration dependencies between user-provisioned parameters and impacted configuration in the components, the O&M function may use a rules engine that reads a persistent file containing all configuration rules including dependencies. For example, an XML file may contain the rules for which MOs to create, dependencies and associations between MOs, order in which MOs need to be created and configured, how the user provided parameters map to one or several attributes in the component MIBs etc.

With respect to provisioning IP configuration and management of a PTS system, a user may enter a public IP network prefix for each host for routing on the external network through a layer 3 (L3) WAN router. The network prefix must be unique for each PTS system to avoid address conflicts. The O&M may obtain a public address after system provisioning to allow connection from anywhere on the WAN.

Each PTS component may be assigned one private address for the O&M, one private address for internal interfaces and one public address for external interfaces. The private addresses may be configured as part of factory installation and the O&M function may configure the external addresses using the user provided network prefix and the fixed allocated host address. Thus, the overall IP network may be separated into two networks divided between local and external IP traffic. Local IP interfaces are assigned addresses from a private network address pool (e.g., 10.1.1.x). This assignment of IP addresses on the local network, which is completely internal to the PTS, reduces the time for configuration at the staging area and the local IP configuration is more robust because it is not sensitive to changes in subnet re-configurations made by the user/operator. It does require that all components are able to separate the physical terminations for private vs. public IP addresses. The external IP traffic routed on the WAN is assigned IP addresses based on the user-provided network ID and host addresses allocated from the last byte in the network address by the PTS and appended to the user provided network prefix.

The IP address space for the UEs is public because these addresses are routed on the WAN outside the PTS. To provide maximum flexibility for the user, and at the same time reduce complexity in PTS regarding address space for all external IP traffic (i.e. both external PTS interfaces and UEs), the user/operator may be responsible for assigning the network prefix for UE address allocation. This user-provided address range may be configured in the GGSN component, which is responsible for allocating IP addresses from this pool to the UEs. To avoid conflict of external IP addresses between external interfaces and UEs, the prefixes must be different for external IP traffic and UE IP address allocation.

An operator also may set or adjust parameters related to a Proximity Handling Function (PHF) running on each PTS, which may cause a NodeB (RBS) to shut down, or "wilt" if locations of two or more PTS systems are within a threshold value. These parameters, which may be configured by an operator, include PH Function ON/OFF, which is a Boolean value that enables or disables the PHF function; PH Distance Threshold, which is a distance comparison value used between two PTS systems; PH Number of Sequential Positive Indications, which is a number of sequential times the PHF must detect two PTS systems are operating within or less than the PH Distance Threshold; and PH Number of Sequential Negative Indications, which is a number of sequential times the function must detect that two PTS systems are operating beyond or exceeding the PH Distance Threshold. The unit of measure for the sequential indications may be provided by KA messages.

If a system is re-provisioned in the same community (same multicast group), attributes such as the PTS-ID and UARFCN list may change. This information will be detected in the next KA message and will be updated in the existing community member's tables after triggering O&M configuration events in those other members. CCT, IMSI and subscriber information are normally maintained (i.e., persistent) during re-provisioning.

UC2: PTS System Initialization/Restart

UC2 corresponds to the Start/Restart module 522, which relates to initialization/restart scenario after provisioning a PTS system, as shown in FIG. 6. This use case may occur when the O&M function indicates it has provided published configuration parameters and is ready to provide network services and community membership (e.g., via an Inter-Process Communication (IPC)) after power up and basic system initialization.

Figure 7:
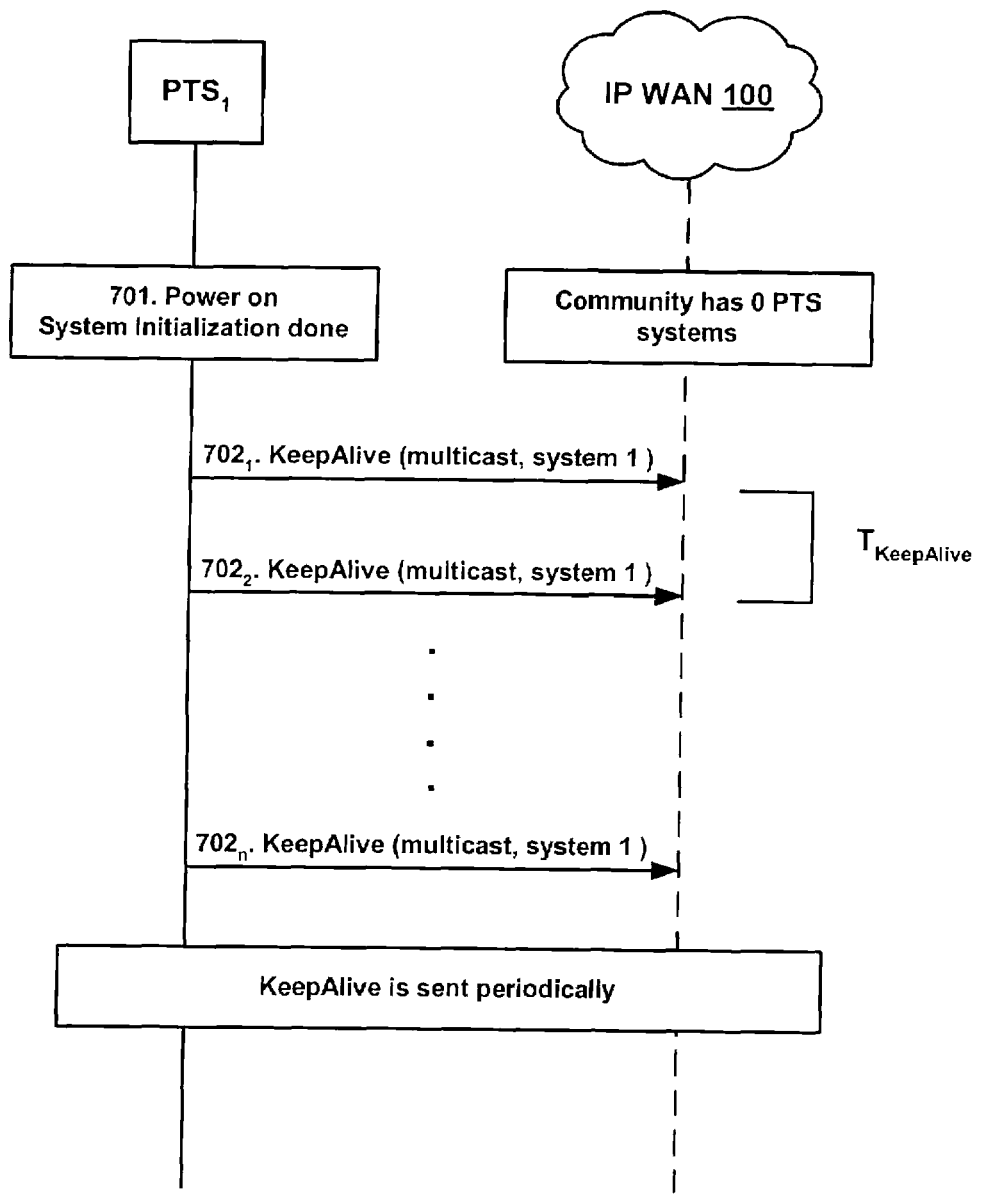
FIG. 7 is a diagram illustrating exemplary PTS Protocol at initialization/restart of a PTS system in accordance with some embodiments.

FIG. 7 illustrates an exemplary initialization/restart use case scenario in which a first system, $PTS_1$, initiates community formation. At 701, the $PTS_1$ is powered up in a start or re-start operation. At $702_1$, a KA message is sent after basic system initialization and when the O&M signals the PTSPM that the system is ready to exchange configuration and records with other community members. The PTS system continues to advertise its presence by sending KA messages every $T_{KeepAlive}$, at $702_2$-$702_n$. The system also will monitor for other KA messages that may be broadcast from other PTS systems in the network.

Each time a KA message is received from a PTS system that is unlinked, a PTS-to-PTS communications link may be established. As part of establishing this link, the PTSPM may fetch the configuration table and check the PTSPM version of the other PTS system. In case of differing versions, each PTSPM may operate on messages (or parts of messages) it understands and ignore what it cannot understand.

The PTS system will start a timer $T_{purgeconfig}$ for each PTS system entry in its Community Configuration Table (CCT). The CCT is configured as empty from the factory and is only populated via the Inter-PTSP. The table entries are persistent.

UC3: PTS System Joins a Community

UC3 corresponds to procedures carried out by the PTS Detection module 524 and Learning/Updating module 526. The PTS Detection module is responsible for detecting a PTS system joining an existing community. UC3 may trigger this module when a PTS system first detects a KA message from another PTS system. Before this may happen, at least two PTS systems must have performed the system initialization/restart processes related to UC2, as shown in FIG. 6. UC3 may involve two or more PTS devices that are started or re-started in a concurrent or quasi-concurrent manner or one or more PTS system participating in an existing community detecting a PTS system entering the community (i.e., at least one other PTS system is present in the network with the same multicast group).

Figure 8:
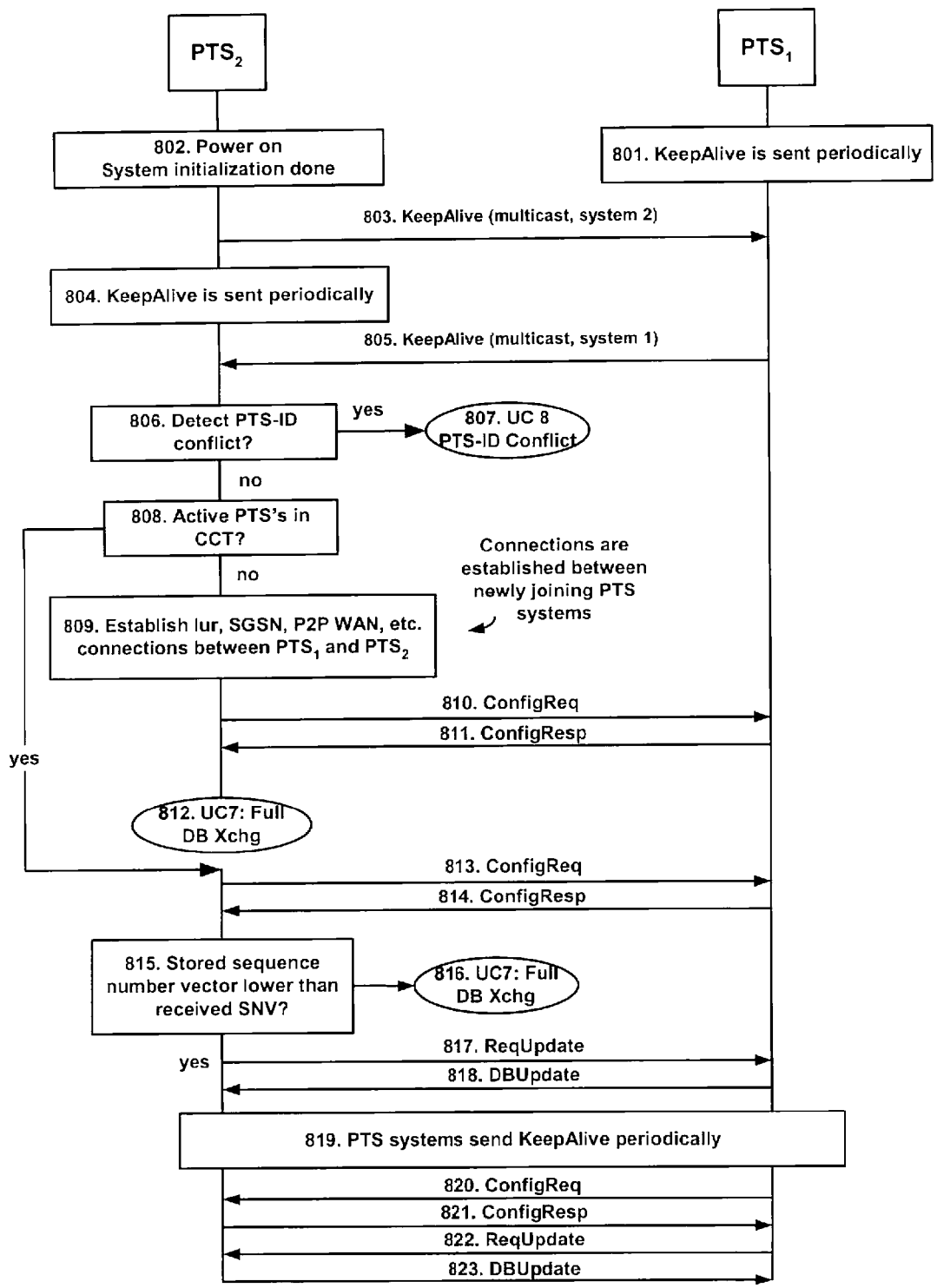
FIG. 8 is a diagram illustrating exemplary PTS Protocol performed when a PTS system joins an existing community in accordance with some embodiments.

FIG. 8 illustrates exemplary processes performed in a UC3 scenario between two PTS systems provisioned with a same multicast group address. At 801, the $PTS_1$ system is connected to the WAN and is sending KA messages periodically and monitoring for incoming KA messages from other PTS systems. At 802, the $PTS_2$ system has completed its power up and system initialization, and at 803-804 the PTSPM of $PTS_2$ begins broadcasting a KA message and initializes its $T_{KeepAlive}$ counter for periodic broadcast.

At 805, the $PTS_2$ system receives a KA message from the $PTS_1$ system. The $PTS_2$ system checks if the PTS-ID/PTS-MAC value pair from the KA message matches an existing entry in its CCT at 806. If there is a conflict, that is, $PTS_1$ has a same PTS-ID as $PTS_2$, but different PTS-MAC as another entry in the CCT (including that of $PTS_2$), UC3 ends and UC8: PTS-ID Conflict begins (described later) at 807.

If $PTS_2$ does not detect a PTS-ID conflict, at 808 $PTS_2$ determines whether it lists no active systems in its CCT. If it does not, $PTS_1$ is the first system $PTS_2$ communicates with after joining a community, and at 809 the PTSPM establishes a peer-to-peer WAN link to $PTS_1$. $PTS_2$ also notifies the O&M to configure the SGSN and Iur addresses towards $PTS_1$ so that the SGSN and RNC can establish the corresponding connections.

After establishing communication link with $PTS_1$, the PTSPM in $PTS_2$ executes procedures of Learning/Updating module 526 to send a ConfigReq message to $PTS_1$ at 810, which requests configuration data from the $PTS_1$ system. At 811, the $PTS_1$ system responds with a ConfigResp message containing the configuration data of $PTS_1$. Upon receipt of the ConfigResp message, $PTS_2$ stores the configuration data and updates the Configuration Sequence Number (CSN) for $PTS_1$ in its CCT. $PTS_2$ then starts a timer $T_{purgeconfig}$ in the CCT to keep track of KA messages from the $PTS_1$ system. At 812, UC3 ends and UC8: Full DB Exchange begins (UC8 will be described later in detail).

If at 808 $PTS_2$ determines it already has entries of active PTS system in its CCT, and if the received CSN is different from one stored for $PTS_1$ in the CCT, at 813 $PTS_2$ sends a ConfigReq message to $PTS_1$. Upon receipt of the ConfigResp message containing $PTS_1$'s configuration data at 814, $PTS_2$ stores the configuration data and updates the CSN for $PTS_1$ in the CCT.

At 815, if PTS-SM sequence numbers stored in the CCT are lower than those in the received PTS-SM SNV (i.e., PTS-ID and the Sequence Number of the current subscriber data version that the sender has for that PTS-ID), $PTS_2$ sends a ReqUpdate message to $PTS_1$ listing those PTS-ID/Sequence Number pairs in the SNV that need updating. It receives and processes a DBUpdate message from $PTS_1$ at 818 containing the PTS-SM data update(s), passes the data to its PTS-SM to update its DB, and following successful storage, updates the SNV in its CCT to end UC3.

If at 815 it is determined that PTS-SM sequence numbers stored in the CCT are higher than those in the received SNV, PTS-SM data de-synchronization has occurred. In this case, UC3 ends and UC8: Full DB Exchange is triggered at 816.

Over time, the PTS systems continue to exchange periodically sent KA messages, as represented at 819. When a KA sent to $PTS_1$ includes a change in its CSN, the $PTS_1$ may send a ConfigReq 820 to $PTS_2$ requesting data update. $PTS_2$ will respond with a ConfigResp message 821 containing $PTS_2$'s configuration data. Similarly, a change detected in a received SNV of $PTS_2$ may result in a FullDBReq message, or a ReqUpdate message 822 and corresponding response DBUpdate message 823 containing the requested PTS-SM update. The $PTS_1$ will accordingly update the CSN and SNV sequence values for $PTS_2$ in its CCT.

UC3 establishes $PTS_2$ as a community member and periodic KA messages are exchanged in the community. $PTS_2$ exchanges data updates with all available community members.

UC4: Data Update(s) in Existing Community

UC4 corresponds to procedures carried out by the PTS Detection module 524 and Learning/Updating module 526 and represents a use case scenario in which a PTS system detects that there has been a change in another PTS system's configuration or subscriber records and requests the corresponding updated information. This use case may be triggered upon detection of a KA message from another PTS system.

As indicated in FIG. 6, at least one instance of UC3 has occurred to form a community prior to UC4. Each PTS system participating in the community periodically sends out a KA message to inform other community members of its current status and latest data versions. For example, the $PTS_1$ system of FIG. 8 receives a KA message from another member in the community (i.e., $PTS_2$). The Detection module 524 of the PTSPM $PTS_1$ system detects the KA and resets the timer $T_{purgeconfig}$ to keep track of KA messages from the $PTS_2$ system.

If $PTS_1$ detects that two systems have the same PTS-ID but different PTS-MAC's (including that of $PTS_1$), then UC4 ends and UC8: PTS-ID Conflict begins.

If $PTS_1$ system detects that the CSN in the KA message from the $PTS_2$ system is different than that in the CCT, the Learning/Updating Detection module 526 of the PTSPM causes the $PTS_1$ system to send a ConfigReq message to $PTS_2$. In response, the $PTS_1$ system receives a ConfigResp message from $PTS_2$ containing the current configuration data of $PTS_2$, which is stored in the CCT after which the CSN entry for $PTS_2$ is updated.

If the $PTS_1$ system detects that one or more Sequence Number in the PTS-SM SNV contained within the KA message from $PTS_2$ is (are) larger than the corresponding number (s) in the SNV stored in its CCT, then the $PTS_1$ system sends a ReqUpdate message to $PTS_2$ listing those PTS-ID/Sequence Number pairs that need updating. $PTS_2$ responds with a DBUpdate message containing the updates. The $PTS_2$ may optionally elect to send its entire DB rather than delta information if the size of the requested updates is large (e.g., when data exceed a predetermined threshold amount). $PTS_1$ passes the received DB updates to its own PTS-SM to accomplish data synchronization and updates the sequence numbers in its stored SNV for each PTS for which an update was received.

If any sequence numbers of the SNV are lower than those stored in the CCT, a de-synchronized condition is identified. The UC4 ends and UC7: Full Data Exchange is triggered.

Figure 9:
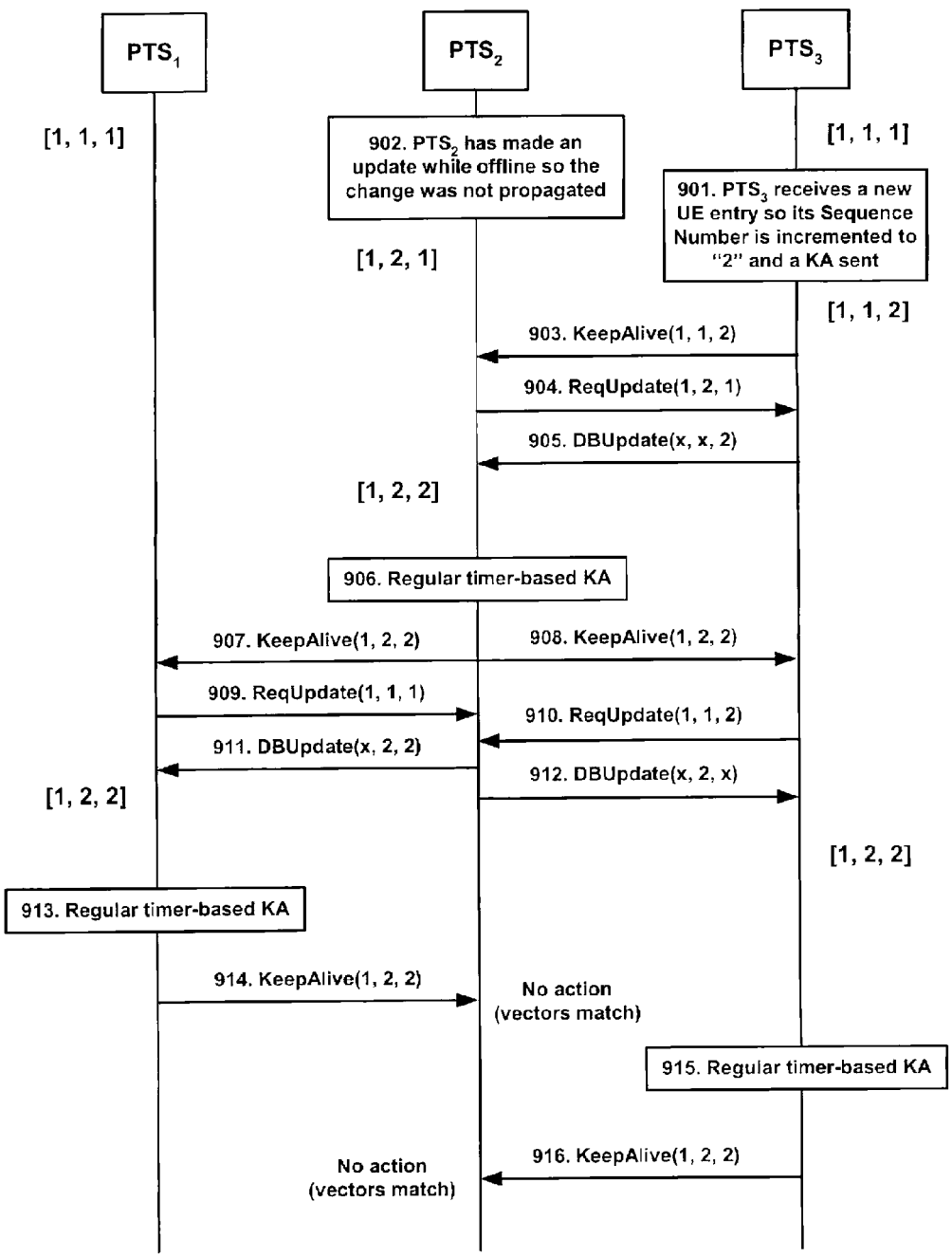
FIG. 9 is a diagram illustrating exemplary PTS Protocol performed when PTS systems update data in an existing community in accordance with some embodiments.

FIG. 9 is a diagram illustrating another UC4 scenario in which a PTS community may synchronize data between PTS systems that are not directly communicating with each other. In this scenario, $PTS_1$ and $PTS_3$ cannot communicate with each other (perhaps they belong to different isolated sub-communities), but are each able to communicate with $PTS_2$. The $PTS_2$ system will function as a bridge between the $PTS_1$ and $PTS_3$ systems.

In FIG. 9, the notation [x, y, z] is used to indicate the PTS-SM SNV. For example, the SNV [2, 1, 5] would indicate that this PTS has data from sequence number 2 for $PTS_1$, sequence number 1 for $PTS_2$, and sequence number 5 for $PTS_3$. The record of each subscriber indicates which PTS this subscriber was registered to, and the sequence number in effect for that PTS at the time of attachment. The following signaling flow illustrates the KA and DBUpdate cycle, and shows how all data remain synchronized among the PTS system even if members begin from differing information baselines, and even if some members cannot directly communicate with one another.

At 901, $PTS_3$ has an internal database change involving the status of one of its subscribers. It increments its own sequence number and multicasts a KA message containing the SNV that includes sequence numbers for subscribers belonging to other PTS systems. Additionally, $PTS_2$ was updated at 902 while offline, but this change has not yet propagated to the other PTS systems.

The change in $PTS_3$ is heard by $PTS_2$ via the KA message at 903, and $PTS_2$ requests an update at 904 and passes the sequence numbers of old versions in its PTS-SM DB. The $PTS_3$ system responds at 905 by sending the delta information in its PTS-SM DB that have changed since the sequence numbers that $PTS_2$ reported it had in a DBUpdate message. In this case, the "x's" for $PTS_1$ and $PTS_2$ indicate schematically that the data stream contains information for subscribers of only the $PTS_3$ system.

$PTS_2$'s PTSPM passes the new data to its PTS-SM, which determines which subscriber records need updating. In case of conflicts where different PTS systems claim to be serving the same subscriber, the record with the most recent timestamp may be taken regardless of sequence number.

At 906-908, the $PTS_2$ system sends out its usual timed KA. Both $PTS_1$ and $PTS_3$ see that updates are available. They request updates at 909-910, receive the updates at 911-912, and update their PTS-SM DBs, following the same procedure outlined above.

All PTS systems continue to send KA messages at 913-916, but these do not trigger data exchange actions (except that process such as timestamp updates and resetting $T_{purgeconfig}$ timers may be performed) because the SNV's (and, presumably, all records in the databases) are the same across the community. Hence, subscriber data are synchronized across the community. All PTS systems continue to send KA messages, and to send and respond to other messages as appropriate.

UC5: PTS System Leaves a Community (Unannounced)

UC5 corresponds to procedure carried out in some embodiments by the PTS purging module 528 when a PTS system leaves the community unannounced to other PTS systems in the community, and the PTS systems in the community initiate action to purge the corresponding data.

Figure 10:
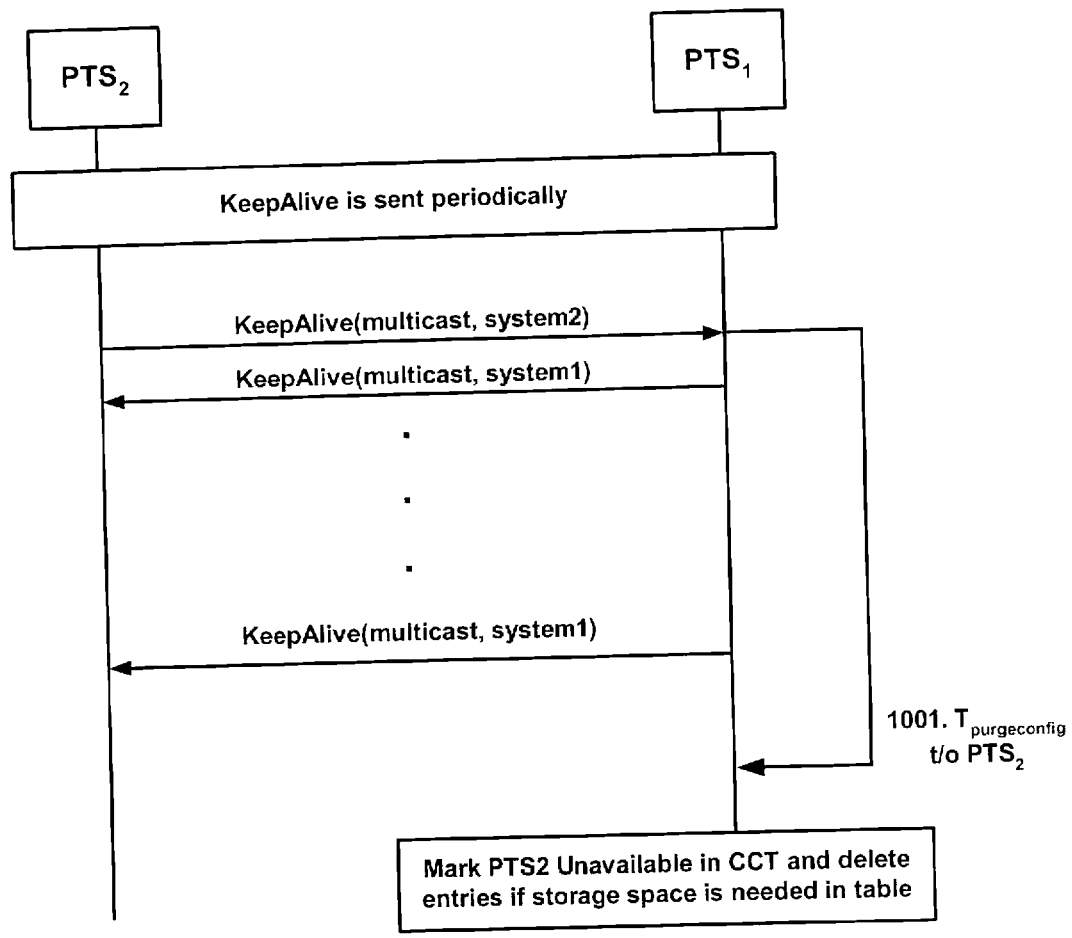
FIG. 10 is a diagram illustrating exemplary PTS Protocol performed when a PTS system leaves an existing community unannounced in accordance with some embodiments.

FIG. 10 shows an exemplary community including a first PTS$_1$ system and a second PTS$_2$ system that have recognized one another and exchanged data in as in UC3 scenario and possibly also the UC4 scenario. Although the FIG. 10 community includes only two PTS systems for brevity in explanation, the same concepts would apply to embodiments in which a community includes more than two systems.

As a result of data exchange, the PTS$_1$ and PTS$_2$ systems store CCT entries for each other. Each PTS system also includes a T$_{PurgeConfig}$ timer for every other system. Each time the PTS$_1$ system receives a KA message from the PTS$_2$ system, it resets the T$_{PurgeConfig}$ timer kept for PTS$_2$. However, at 1001, because a KA messages from PTS$_2$ fails to arrive before the T$_{PurgeConfig}$ timer expires, the PTSPM of the PTS$_1$ marks PTS$_2$ as unavailable in its CCT. The PTSPM also may notify the O&M to purge dynamic configuration data and remove communications links to PTS$_2$ and delete the CCT entries of unavailable PTS systems to free storage space, if necessary.

Hence, a PTS system may detect when another PTS system leaves a community without that PTS announcing that it is leaving, mark the exited PTS system as unavailable in its CCT, and may trigger O&M action. If this clears a previously existing PTS-ID conflict, appropriate actions described later herein with respect to the UC8: PTS-ID Conflict are taken.

The PTS$_1$ system continues to send KA messages and to interact with other community members (if any). If a KA message is subsequently received from the PTS$_2$ system, UC3 may be exercised to re-join the system with the community.

UC6: PTS System Upgrade

A PTS system may be placed offline and reconfigured to upgrade its SW. After powering up the upgraded PTS in a restart operation (i.e., completing UC2: PTS System Initialization/Restart), the PTS may immediately send out a KA message, and resets its T$_{KeepAlive}$ counters. PTS-SM database and CCT information are persistent during the upgrade unless a scratch install has been performed. Configuration and PTS-SM sequence numbers are not incremented during the upgrade process.

If community members are operating with different SW versions, messages may not be fully compatible with those of the upgraded version. The PTS may make a best effort to interpret incoming messages, and ignore portions that it cannot understand. The PTS also may handle local traffic and may be an active participant in a community. The PTS continues to send periodic KA messages and to respond to incoming KA messages as appropriate.

UC7: Full Data Exchange

UC7 provides a mechanism to exchange full DB contents between PTS systems. As shown in FIG. 6, UC3: PTS System Joins a Community is a prerequisite to implementing Full Data Exchange in a community. A Full Data Exchange may be triggered by 1) a PTS joining a community for the first time when it must learn a full set of PTS-SM DB information, and 2) one or more Sequence Number(s) in the SNV (stored in the CCT) being higher than the corresponding number(s) in a received KA message, which indicates a de-synchronized condition.

The PTS sends a PTDP FullDBReq message to the PTS system that sent the KA. A PTS receiving a FullDBReq shall reply with a PTSD DBUpdate message containing the full PTS-SM DB as well as the senders PTS-ID, SNV, and information needed to correlate the request and response messages. The PTS continues to send periodic KA messages and to respond to incoming messages as appropriate.

A PTS receiving a full DB update in response to its own request shall pass it to the PTS-SM for processing and transmittal to the HLR, for example, via an HRA.

To address the possibility that DB's of the PTS systems in a community may become unsynchronized due to sporadic communications, link failures or bugs in a way that may not be corrected with the usual KA and data exchange mechanisms, a mechanism may be provided to exchange full DB contents between PTS systems on a periodic, though infrequent basis (e.g., once every 12 hours).

For example, a PTS may include a counter, T$_{fullDBexchange}$, which is monitored by the PTSPM. Upon timeout of the T$_{fullDBexchange}$ counter, the PTSPM may send a TakeFullDB P2P message to members it is communicating with, and reset its T$_{fullDBexchange}$ counter. This message includes the PTS-ID of the sending PTS system and commands other members to request the entire DB from the sending PTS. All community members may periodically issue a TakeFullDB P2P message to other members, and it can also be triggered manually by an operator, through the central O&M, to force DB synchronization across the community.

A PTS may receive a FullDBReq request from one or more community members in response to sending the TakeFullDB multicast. It shall reply to each responder with a DBUpdate message containing the full PTS-SM DB. The PTS continues to send periodic KA messages and to respond to incoming messages as appropriate.

UC8: PTSID Conflict

UC8 defines actions taken if a PTS System discovers that two members (itself and another member, or two other members) with different PTS-MAC ID's claim the same PTS-ID number.

As shown in FIG. 6, at the time of community formation, when a PTS joins an existing community (i.e., UC3), or while updating data in an existing community (i.e., UC4), a use case may terminate and initiate UC8 following detection of a PTS-ID conflict.

Upon a PTS system detecting a PTS-ID conflict, one or more of the following actions are carried out by the PTSPM:

1. If the community member sharing a PTS-ID but having the higher PTS-MAC ID is the PTS System itself, then the system marks its status as "Unavailable" in the CCT and in subsequent KA message transmissions. It continues to send multicast KA messages and may support local subscriber traffic in a stand-alone manner, but does not participate in other community operations or message exchanges.

2. If two other community members share the same PTS-ID, that PTS with the higher PTS-MAC ID of the two is marked "Unavailable" in the CCT. Message responses and data exchanges with the unavailable system are suspended.

3. A major alarm is thrown by each system to indicate existence of a duplicate PTS-ID assignment in the community.

The unavailable PTS system continues to send KA messages but otherwise does not participate in community operations or message exchanges.

A PTS-ID conflict state may be cleared by the following two conditions:

A. A member having duplicate PTS-ID leaves the community and is purged from the CCT (completion of UC5).

B. A member having duplicate PTS-ID is restarted after being assigned a new PTS-ID. Other community members receive KA messages with the new PTS-ID.

If the conflict state is cleared, the above actions carried out by the PTSPM after detecting a PTS-ID conflict are removed as follows:

1. The PTS System changes its status to "Available" in the CCT and in subsequent KA message transmissions. The PTS responds to messages and participates in the community.

2. If the PTS system with lower PTS-MAC ID was purged, then that PTS system with the higher PTS-MAC ID is marked "Available" in the CCT. Communications and data exchanges are resumed with that system.

3. Each system clears its alarm.

In the above embodiment, a "losing" PTS (i.e., the one having the higher PTS-MAC) will not participate in community functions if a) it sees itself as causing a conflict, or b) other community members see it as conflicting.

In a bridge topology, however, a PTS may have a conflict in one sub-community but not in another. Utilization and throughput may increase if the PTS can participate in those sub-communities in which there is no conflict. In some embodiments, configuration data for all members may be propagated across bridges by utilizing another PTSP message parameter indicating availability/unavailability.

In some embodiments, the CSN parameter may be configured as a CSN Vector (CNV) in a way that is analogous to an SNV used to propagate subscriber DB information. For example, a CNV vector may include a value indicating availability or unavailability of a PTS along with its configuration sequence number. The CNV of the unavailable system also includes information marking itself as available to a member seeing no conflict, but it would remain unavailable to others. Thus, the unavailable system may receive a data update request, or traffic, from another member who sees no conflict. Messages may be sent to conflicting systems to indicate whether other members see the system as available or unavailable.

UC9: PTS System Leaves a Community (Announced)

This use case relates to a procedure performed by the PTSPM PTS purging module 528 of FIG. 5 in which a local PTS system announces to remote systems that it is leaving the community. Notifying the community of a pending PTS system departure may improve data synchronization, permit orderly response, and permit subscribers to be transferred to other systems without severe loss of service.

An announced departure from a community may occur when a PTS system is decommissioned from the community or is re-provisioned with a different multi-cast group ID. Notification of decommission or multicast group change in a local PTS may be sent to remote PTS systems from the O&M subsystem. For example, if an UARFCN or PTS-ID is re-provisioned to different values, the KA message of the local PTS will broadcast these changes and other community members will detect this change. In turn, the remote PTS systems will update the entry in their respective CCTs. The update of either PTS-ID or UARFCN will trigger O&M actions to reconfigure the appropriate configuration in the PTS System.

In some embodiments, a PTSPM of a local PTS system may send a LeavingCommunityInd message (e.g., via multi-cast or P2P) to notify the community of its departure. A LeavingCommunityInd message is utilized by a system to inform the community that it is leaving the community so that the community's tables can be updated appropriately. For example, a LeavingCommunityInd message may include the PTS-ID of the leaving system and fields indicating whether to purge the configuration or PTS-SM DB information of that PTS in the receiving PTS nodes. Hence, the LeavingCommunityInd message may be used for temporary outages and permanent departures, the difference being that a permanent departure may result in the removal of this PTS's information from the community tables and a purge of the associated subscriber records. A temporary departure may result in an availability status in the community tables (e.g., the CCT) being changed from available to unavailable.

Remote PTS systems receiving the LeavingCommunity-Ind message may remove the sender's information from their respective CCTs, remove associated connections, and update their neighbor relations. If there are no more PTS-MAC references for the subscriber records, the community members may remove the subscriber record from the PTS-SM database. If the community members do not receive the LeavingCommunityind message, the community will remove the member's configuration and PTS-SM DB records from community as described in UC5, above. The system leaving the community will re-initialize its community tables and remove any subscriber records that it had learned from the community.

UC10: PTS to PTS Communications Link Lost

In some embodiments, rather than inferring that a PTS is unavailable by waiting for the missing-KA timer $T_{PurgeConfig}$ to expire, a PTS system may be removed from a community after detecting a loss of a communication link to one or more other community systems. This allows PTS systems to take quick action if a P2P link is lost between two PTS systems. For example, an inter-PTS link loss may be detected by a PTS system by an invalid IP address to other PTS system, an inability to set up link, when link was torn down by other member, or when detecting data errors, no response, a timeout, etc. The unreachable or unresponsive PTS system may be marked unavailable in the CCT.

Proximity Detection (Minimize Radio Interference)

PTS systems in a community will usually transmit on a same frequency in order to support soft handover. Since the systems may be mobile, it is possible for two systems to come so close to each other that they cause radio interference in each other's cells. To prevent or minimize radio interference, a Proximity Handling Function (PHF) may be employed in the PTS systems. The PHF, which corresponds to the proximity handling module 532 of FIG. 5, operates independently on every PTS system within the community, and utilizes information contained in the PTSP KA messages (e.g., position and radio state information) exchanged between PTS systems upon entering a community and upon regular intervals.

PHF Throwing

When a new KA message is received at local PTS from another remote PTS system, a PHF (e.g., running on the PTS Special Functions (PTS-SF) board) determines whether required conditions to execute the function are true. If true, the function will calculate the distance between the local and remote PTS systems and determine if the two systems are operating within close proximity of one another. The PHF operating on the local PTS system also will make a parallel decision for every other system operating within the community.

The location information transmitted in the KA messages is fed into a proximity detection algorithm that computes the distance between two PTS systems and wilts one of the systems if the distance between the two systems is less than a threshold value. However, a customer may have an option of electing to allow two or more PTS systems operating in close proximity to continue service (e.g., PTS systems utilizing a directional antenna allowing systems to operate at distances below a threshold value).

Wilting a radio base station (e.g., a UMTS RBS (NodeB)) may be a time-consuming process that cannot be halted until the base station is completely wilted. To reduce or eliminate false triggers of a RBS wilt (e.g., when two systems are closer than the threshold only for a brief period), the PHF provides a delay or hysteresis to the measurements to ensure that wilting does not occur. This delay may be introduced by determining two PTS systems are operating within close proximity over several sequential iterations before shutting down one of the PTS RBSs.

Because the PHF determines proximity when a new KA message is received, this creates a direct relationship between the KA update interval and the function delay period. When the number of sequential positive triggers exceeds the threshold, the function will determine if the local RBS (NodeB) transmitter should "shutdown" and no longer radiate. This determination also may be based upon shutting down either one of the PTS systems according to a priority scheme, such as shutting down the PTS having higher (or lower) PTS-MAC address, shutting down the PTS serving a lower volume of subscribers between two PTS systems, or another priority mechanism.

PHF Clearing

The PHF also may determine when a pair of PTS systems operating within the community has moved beyond the threshold distance. A clearing portion of the PHF will execute when: 1) the two PTS systems have determined over a number of sequential indicates that they are no longer operating within close proximity; 2) a KA message is not received at the expected interval time; or 3) a single KA message is received indicating that a remote PTS system involved in a shutdown operation has disabled the PHF, ceased operation, changed UARFCN of either the uplink or downlink, or lost GPS lock.

In any PHF clearing case, the clearing portion of the function must take into consideration that more than one PTS system operating within the community may have caused the local PTS system to shutdown. In such a case, the local PTS system may only resume radiation of the local system after all shutdown dependencies with other PTS systems operating within the community have been cleared.

Inputs to the Proximity Handling function may include the following inter-PTS Protocol (PTSP) message fields: Position (e.g., latitude, longitude etc.); PTS-MAC; UARFCN; Radio Status; GPS Lock; and Proximity On (indicating if the remote PTS system has enabled or disabled the PHF). The PHF compares these attributes with similar attributes on the local PTS system.

Upon receipt of a PTSP KA message, the proximity handling module 532 (e.g., executing on the PTS-SF board) may execute a proximity handling algorithm. This procedure may include the following exemplary rules for shutting down the local RBS:

1) The remote or second PTS system must be less than the threshold distance from the local PTS system.
2) The number of distance threshold triggers must exceed the programmed value.
3) The uplink or downlink UARFCN radio frequency channel must be the same on each RBS.
4) The local and remote PTS system must both have "GPS Lock" indicating accurate position information is available.
5) The PTS system with the lower PTS-MAC remains transmitting; the system with the higher PTS-MAC will wilt.

Additionally, the algorithm may include the following exemplary rules for unlocking or resuming radiation of the local RBS:

1) The remote or second PTS system must be greater than the threshold distance from the local PTS system.
2) A missed KA message is treated the same as if the remote or second PTS system is greater than the threshold distance.
3) The number of distance threshold "clears" must exceed a programmed value.
4) The uplink or downlink UARFCN radio frequency channels must be the same on each RBS.

While the above rules correspond to a UTMS system, it is to be appreciated that concepts described herein maybe applied to other telecommunication systems. Also, while the PTS system with the lower PTS-MAC remains transmitting and the higher PTS-MAC will resume transmitting (assuming that another PTS system operating within close proximity has not also placed a the RBS in a wilt condition), another priority scheme may be utilized to designate which PTS system of a PTS pair would wilt.

FIGS. 11a-11d illustrate exemplary procedures carried out by the PHF. These procedures are described in connection with various scenarios addressed by the proximity handling module 532. Although these scenarios are described with respect to a single PTS system pair, $PTS_1$ and $PTS_2$, each PTS system may perform a parallel operation with every other system operating in a community.

UC11: Proximity Handling Function Trigger

UC11 describes the action taken when a PTS System determines it is operating less than the PTS Distance threshold value from another system within the community. A first PTS system, $PTS_1$, is connected to the WAN and operating normally. The PTS-SF has received a KA message from another PTS system ($PTS_2$) operating within the community.

Figure 11A:
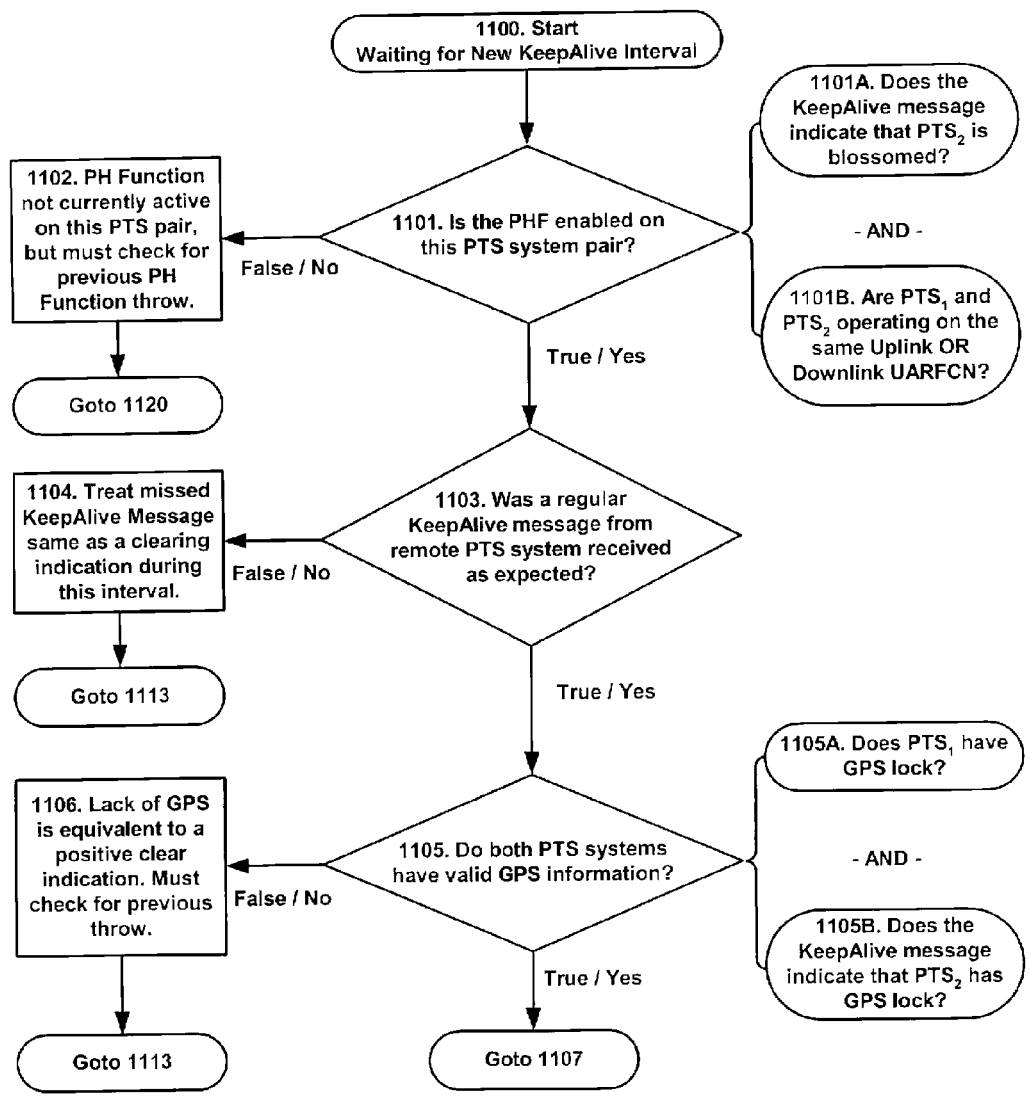
FIGS. 11a-11d depict a flowchart of an exemplary proximity handling function procedure performed at a PTS system node in accordance with some embodiments.

With reference to FIG. 11a, the $PTS_1$ system has received a KA message at 1100 from a remote $PTS_2$ system operating within the community, and at decision block 1101, the PHF determines if the Proximity Handling Function is enabled on the $PTS_1$ and $PTS_2$ systems. This may include determining at 1101A whether the KA message transmitted from $PTS_2$ indicates $PTS_2$ is blossomed, and at 1101B whether the $PTS_1$ and $PTS_2$ systems are operating on the same uplink or downlink UARFCN. If not (i.e., "No" at 1101), the PHF function is not active on this PTS pair and a check must be made for a previous function throw (1102). This condition is not within the scope of UC11, but will be described later in connection with UC14 and UC15.

If the PHF is enabled on the PTS pair (i.e. "Yes" at 1101), the PHF proceeds to decision block 1103 and determines whether a regular KA message was received within the expected time interval. If not (i.e., "No" at 1103), the PHF will treat this as a clearing indication (1104), and the PHF checks to see if a previous trigger exists, and if so, increments a clearing counter. This condition is not within the scope of UC11, but will be described later herein in connection with UC12a and UC12b.

If the KA message was received as expected, at decision block 1105 the PHF determines whether both PTS systems have valid GPS information. For example, it is determined at 1105A whether $PTS_1$ has GPS lock, and at 1105B that the KA transmitted from $PTS_2$ indicates $PTS_2$ has GPS lock. If not (i.e., "No" at 1105), the PHF does not have valid GPS information, which is treated as the equivalent of a positive clear indication. This is not within the scope of this use case, but is described later in UC13.

Figure 11B:
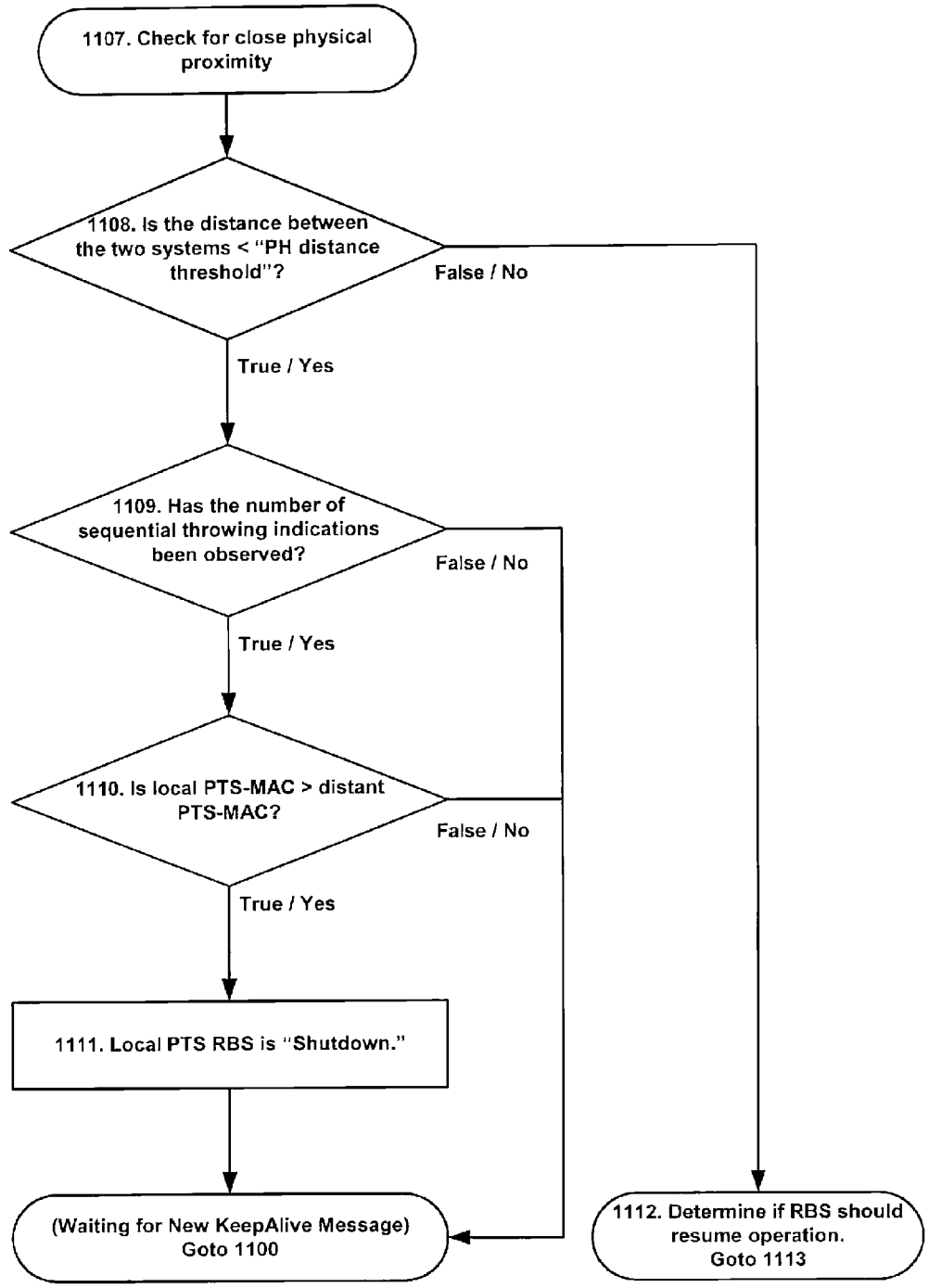

If valid GPS information is received for the PTS pair, the PHF advances to the procedure 1107: Check for close physical proximity, as shown in FIG. 11b. At decision 1108, the PHF checks whether the physical distance between the two PTS systems is less than the distance threshold. If not (i.e., "No" at 1108), the PHF must determine whether a previously thrown indication must be cleared, and the algorithm continues to that procedure at 1114. This is not within the scope of this use case, but is described later in UC12a.

If the distance threshold is met at decision 1108, at decision 1109 the PHF checks whether the required number of positive sequential throwing indications has been observed. If not, this iteration is complete, and the PHF process returns to 1100 and waits for the next KA interval. This scenario illustrates the iterative approach towards RBS shutdown.

If the required number of iterations has been reached, the PHF next determines, at decision block 1110, whether the $PTS_1$ PTS-MAC is greater than $PTS_2$ PTS-MAC. If "Yes," the local $PTS_1$ RBS is shutdown at process 1111, and local $PTS_1$ ceases RF radiation. If not (i.e., "No" at 1110), the iteration is complete, and the PHF returns to 1100 and waits for the next KA interval.

UC12a: Proximity Handling Function Clear

UC12a describes an action taken when a PTS system determines it is operating at a distance greater than the PTS Distance Threshold from another system within the community. A precondition to this scenario is that the local $PTS_1$ system is connected to the WAN and has been wilted by a previous PHF action.

Referring again to FIG. 11a, a PHF clear may be triggered at 1100 when the PTS-SF of $PTS_1$ has received a KA message from another PTS system (e.g., $PTS_2$) operating within the community. Next, at 1101 the PHF determines if the Proximity Handling Function is enabled on both $PTS_1$ and $PTS_2$. If not (i.e., "No" at 1101), the PHF checks whether a previous trigger has the $PTS_1$ in shutdown (1102) (to clear any lock dependency on these two systems, if needed). This scenario is not within the scope of this use case, but is described below in UC14 and UC15.

At decision 1103, the PHF determines whether a regular KA message was received within the expected time interval. If not, the PHF treats this as a clear indication, and the PHF checks to see if a previous trigger exists (to increment the clearing counter if a trigger exists, see UC12a and UC12b).

If the KA was received within the expected time interval, the PHF proceeds to decision block 1105, where it determines whether both PTS Systems have valid GPS information. If not, the PHF treats this as a positive clear indication, and the PHF checks to see if a previous trigger exists (1106) (to increment the clearing counter if a trigger exists). This scenario will be described later in UC13.

If both PTS systems have valid GPS information, the PHF advances to the procedure 1107: Check for close physical proximity depicted in FIG. 11b, in which decision 1108 checks whether the physical distance between the two PTS Systems is less than the distance threshold. If it is (i.e., "Yes" at 1108), this is a throwing case rather than a clearing case, and the PHF continues to decision 1109. PHF throwing is not within the scope of this use case, but described above in connection with UC11.

Figure 11C:
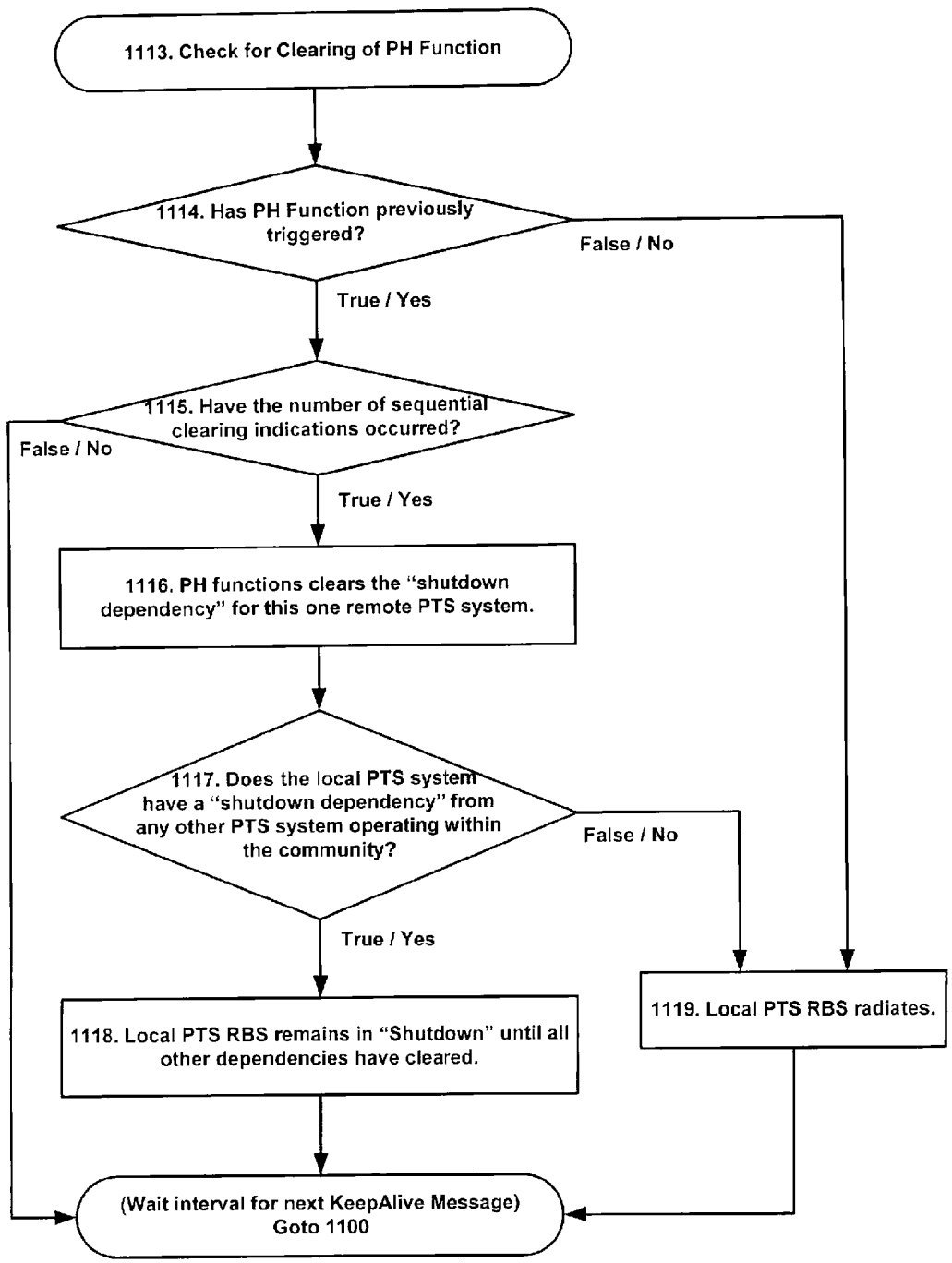

If the distance is not less than the threshold value, the PHF must determine whether a previously thrown indication must be cleared (1112), and the PHF advances to procedure 1113: Check for clearing of PH Function, which is shown in FIG. 11c. At this time, a clearing counter may be incremented. At decision 1114, the PHF determines whether the function has previously triggered. If not (i.e., "No" at 1114), the process 1119 would allow the local $PTS_1$ RBS to continue radiating. However, this scenario is not within the scope of UC12a because a wilted PTS would have previously triggered a PHF, so this path is not applicable to UC12a.

If decision 1114 determines that a PHF has been thrown, the PHF determines at decision 1115 whether the current number of sequential clear indications of the clearing counter has exceeded a preset threshold value (e.g., a current count value of the clearing counter is compared with a preset "PH Number of Sequential Negative Indications" or other preset threshold value). If it has not, the PHF returns to 1100 and waits for the next KA interval.

If decision 1115 determines that the required number of sequential clear indications has occurred, at process 1116 the PHF clears the shutdown dependency for the PTS System pair (i.e., $PTS_1$ and $PTS_2$ in this example).

Next, the PHF determines at decision 1117 whether there is a shutdown dependency between $PTS_1$ and any other PTS System operating within the community. If "Yes," the $PTS_1$ system remains in "Shutdown" until all other dependencies have cleared, as indicated in process 1118. If no dependency exists, the $PTS_1$ system is blossomed and allowed to radiate at process 1119.

UC12b: Missed KeepAlive Message

UC12b involves an error condition in which a PTS System that has been previously soft-locked or wilted fails to receive a regular KA message. As pointed out above, a missed KA message is treated the same as if a remote or second PTS system is greater than the threshold distance.

Returning to FIG. 11a, UC12b begins at 1100 and a KA message interval occurs on a local PTS system (e.g., $PTS_1$). Next, at decision 1101 the PHF determines whether the Proximity Handling Function is enabled on both $PTS_1$ and another remote PTS system (e.g., $PTS_2$). If not (i.e., "No" at 1101), the PHF checks whether a previous trigger has the $PTS_1$ in shutdown (1102) (to clear any lock dependency on these two systems, if needed). This scenario is not within the scope of this use case, but is described below with respect to UC14 and UC15.

If decision 1101 determines that the PHF is enabled on the local $PTS_1$ system and the $PTS_2$ system, the PHF next determines at 1103 whether a regular KA message was received within the expected time interval. If yes, the algorithm continues, but this scenario is not within the scope of a missed KA in UC12b. If the KA is not received within the expected interval, the PHF treats this event as a clearing indication (1104) and the algorithm continues to the procedure 1113: Check for clearing of PH Function shown in FIG. 11c. At this time, the clearing counter may be incremented.

At decision 1114, the PHF checks whether the function has previously triggered. If "No," the RBS continues to radiate (process 1119), and UC12b ends. If decision 1114 determines the PHF has previously triggered, the "Yes" path is taken and the algorithm continues to decision 1115, which checks whether the required number of sequential clearing indications has occurred. If not, the function takes the "No" path, ends UC12b, and returns to 1100 and waits for the next KA interval. If decision 1115 determines the required number of sequential clearing indications has occurred, the "Yes" path is taken to process 1116 in which the function clears the shutdown dependency for this one remote PTS System (i.e., $PTS_2$ in this example).

Next, the PHF determines at 1117 whether the local $PTS_1$ system has a shutdown dependency with any other PTS System operating within the community. If "Yes," the RBS remains in shutdown until all dependencies are cleared (process 1118). If no dependencies remain (i.e., "No" at 1117), process 1119 allows the RBS to radiate. The $PTS_1$ system, therefore, unlocks and radiates in UC 12b if the appropriate conditions have been met.

UC13: No GPS Position Information

UC13 describes an action taken when a PTS system determines that either the local system (e.g., $PTS_1$) or the remote system (e.g., $PTS_2$) does not have GPS lock, and accurate position information is not available. For example, the $PTS_1$ system is connected to the WAN and operating normally, and its PTS-SF has received a KA message from another PTS system (PTS$_2$) operating within the community.

With reference to FIG. 11a, at 1100 the KA message is received by the local PTS$_1$ system from the remote PTS$_2$ system. The PHF determines whether the Proximity Handling Function is enabled on PTS$_1$ and PTS$_2$ at decision 1101. If it is not, the PHF will check whether a previous trigger has PTS$_1$ in shutdown, but this scenario is not within the scope of UC13. A "No" decision at 1103 also would not be within the scope of this use case.

At decision 1105, the PHF determines whether both the PTS$_1$ and PTS$_2$ systems have valid GPS information. If "Yes," the algorithm continues, and UC13 ends because this would be an invalid GPS scenario for this use case. If PTS$_1$ and PTS$_2$ have invalid GPS information, the PHF treats this as a positive clear indication and determines whether a check must be made as to whether a previous trigger exists (1106), and increments the clearing counter. The PHF then proceeds to the procedure 1113: Check for clearing of PH Function, which is depicted in FIG. 11c.

In decision 1114, the PHF checks whether the PH function has previously triggered. If "No," process 1119 allows the RBS to continue radiating and UC13 ends.

If decision 1114 determines a PHF function has previously triggered, at decision 1115 the PHF checks to see if the required number of sequential clearing indications have occurred. If it has (i.e., "Yes" at 1115), process 1116 clears the shutdown dependency for this one remote PTS System. If not, the PHF returns to 1100, waits for the next KA interval, and UC13 ends.

At decision 1117, the PHF determines whether the local PTS System has a shutdown dependency with any other PTS System operating within the community. If so, the "Yes" path is taken and the RBS remains in shutdown (process 1118). If there is no existing dependency (i.e., the "No" path from decision 1117), process 1119 allows the RBS to radiate.

UC14: Proximity Handling Function Disabled

UC14 describes the action taken when a PTS System determines that either the local system (e.g., PTS$_1$) or the remote system (e.g., PTS$_2$) has the PTSP "PH Function ON/OFF" value set to "zero" or any logical indication of "no." UC14 may be triggered when a PTS system is connected to the WAN and its PTS-SF receives a KA message from another PTS system operating within the community.

For example, after the local PTS$_1$ system receives a KA message from the remote PTS$_2$ system at the start process 1100, the PHF determines at decision block 1101 whether PHF is enabled on both PTS$_1$ and PTS$_2$ (e.g., each indicating "ON" with respect to the attribute "PH Function ON/OFF"). If it is enabled, the algorithm continues by taking the "Yes" path from 1101. However, because this condition is clearly not within the scope of disabled PHF, this particular use case UC14 ends. If either one of PTS$_1$ and PTS$_2$ has the PHF feature disabled (i.e., "No" at 1101), the PHF will check whether a previous trigger has PTS$_1$ in shutdown (process 1102) and determine whether the lock dependency on these two systems needs clearing.

The PHF process continues to procedure 1120 depicted in FIG. 11c: Check for Immediate Clear. At decision 1121, the PHF determines whether the function has previously triggered. If it has (i.e., "Yes" at 1121), the algorithm continues. If not, process 1125 allows the local RBS to radiate, and the PHF returns to 1100 and waits for the next KA, which is not applicable to UC14.

At process 1122, the PHF clears the shutdown dependency on the PTS system pair. Next, at decision block 1123, the PHF determines whether there is a shutdown dependency between the local PTS$_1$ system and any other remote PTS system within the community. If a dependency exists (i.e., "Yes" at 1123), process 1124 causes the PTS$_1$ system to remain in shutdown until all other dependencies are cleared and the PHF returns to 1100 and waits for the next KA period. If there are no existing dependencies (i.e., "No" at 1123), process 1125 allows the local PTS$_1$ to radiate, and thereafter the PHF returns to 1100 and waits for the next KA period.

UC15—Operator Initiated Change to PHF Configuration

UC15 describes an action taken when a PTS System determines that the operator of either the local system (e.g., PTS$_1$), or the operator of the remote system (e.g., PTS$_2$), has changed the state of the PTSP "PH Function ON/OFF" value. This includes both a change from on to off, and a change from off to on. This use case is triggered after the PTS$_1$ system is connected to the WAN and operating normally (the radiation state of PTS$_1$ may be either radiating or wilted), and the PTS-SF of the local PTS$_1$ has received a KA message from another PTS system (e.g., PTS$_2$) operating within the community.

As shown in FIG. 11a, at 1100 a KA message is received by the local PTS system (PTS$_1$) from the remote PTS$_2$ system. At decision block 1101, the PHF determines whether the Proximity Handling Function is enabled on both of the PTS$_1$ and PTS$_2$ systems. If it is (i.e., "Yes" at 1101), the algorithm continues, but this scenario would not be within the scope of this use case where the configuration has changed.

Figure 11D:
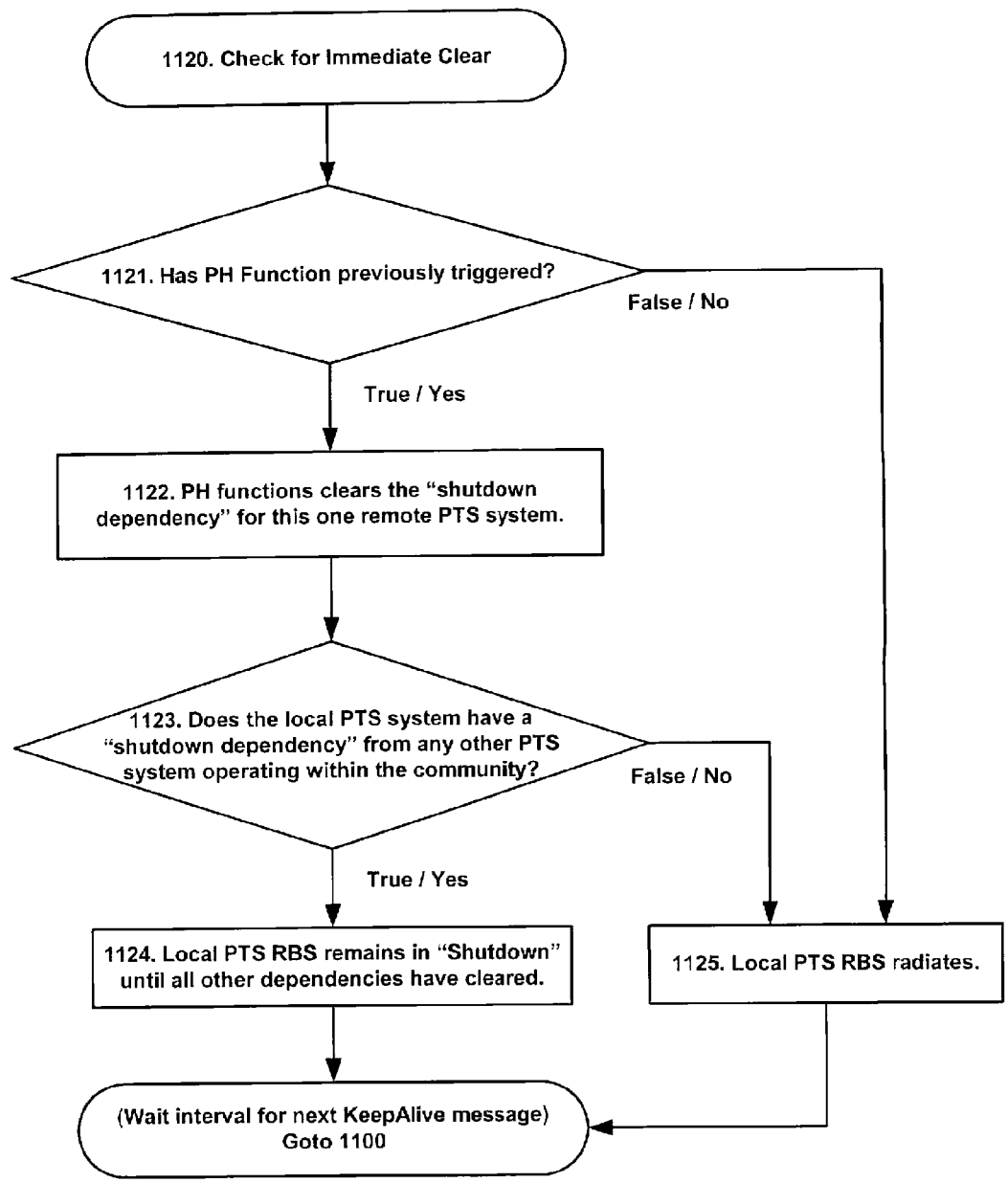

If one or both PTS systems do not have PHF enabled (i.e., "No" at 1101), the PHF function is not active on this PTS pair (process 1102), and the PHF executes procedure 1120 shown in FIG. 11d: Check for Immediate Clear. The PHF next determines at 1121 whether the function has previously triggered. If it has no, the "No" path is taken to process 1125, which causes the local PTS$_1$ RBS to continue to radiate and the PHF to return to 1100 and waits for the next KA message interval. If the function has triggered, the "Yes" path is taken to process 1122, where the PHF clears the shutdown dependency for this PTS system pair (PTS$_1$ and PTS$_2$).

Next, the PHF determines at 1123 whether there is a shutdown dependency between PTS$_1$ and any other PTS System operating within the community. If "Yes," process 1124 causes the PTS$_1$ remains in shutdown. If "No," the PTS$_1$ is blossomed and allowed to radiate at 1125. After process 1124 or 1125, the PHF procedure returns to 1100 and waits for the next KA period.

Auto discovery and update protocol described herein provides robustness by maintaining peer system and subscriber status information of community members at each connected peer, and by detecting when other community members enter or leave the community.

Each PTS is a complete telecommunications system (e.g., UMTS) supporting circuit-switched and packet-switched calls, short messages, voice mails and group calls. It can therefore operate as a standalone system providing all these services to UEs in its radio coverage area even if it has no connectivity to an IP WAN or the PSTN. Systems may be completely homogeneous and combined to scale the system. Also, PTS systems may be made mobile because they are compact due to small footprint and self-contained nature of implementation.

The relative simplicity of the PTS O&M used in the PTS system can be configured quickly and easily because the number of parameters to be configured by the operator may be kept to the bare minimum (e.g., less than 20). Wherever possible, parameters required to configure the PTS components are derived from one or more operator parameters. Alarms are correlated and self-healing actions, and are performed to attempt automatic recovery from faults. The formation of a community is automatic and the PTS systems in a community auto-configure themselves to support roaming and intersystem calls without any operator intervention.

A PTS collective is resilient to the failure of one or more systems because subscriber data is replicated in the collective. Subscribers may move or roam from one PTS system to another and still obtain the full suite of services and maintain authentication. Thus, subscribers are "at home" in every PTS system in the community and never tied to any one particular PTS system to gain access to any service.

Location information of compact PTS system (e.g., tracked via GPS) can be used in diverse ways to make the behavior of the systems adapt to movement and location. For example, location information provided by a PTS system is utilized to minimize cell interference if systems come near each other geographically (e.g., using latitude, longitude and elevation). Cell interference could also be minimized by using radio channel measurements (such as adjacent cell ids) in addition to or instead of GPS information. Geographical proximity also may be used to trigger formation of subgroups within the larger collective to minimize configuration impact and to provide location-based services.

After synchronization of HLR contents, an individual system may continue to provide service even if it loses network connectivity to external entities. The system may even restart and return to service without dependencies on any external entity.

While the invention has been described in connection with network communication nodes that may discover one another as they enter and leave a network community, the invention may be practiced in a variety of communication environments and applications. For example, each communication system node may simply be preconfigured to include all the information of other devices intended to participate community and/or updates of subscribers and configuration data may be performed on a regular schedule. For example, some embodiments may include all, a subset or none of the automatic node discovery aspects described herein, as long as some form of presence message including location and identification information is exchanged between the nodes.

It will be apparent to those skilled in the art that various changes and modifications can be made in the methods and configurations for power control of a telecommunication system radio base station (Base Transceiver Station (BTS), Base Station (BS), or any implementation of a NodeB) of the present invention without departing from the spirit and scope thereof. Thus, it is intended that the present invention cover the modifications of this invention provided they come within the scope of the appended claims and their equivalents.

What is claimed is:

1. A method for controlling the power of a radio base station (RBS) associated with a local network node among a network of telecommunications system nodes including at least a local network node and a remote network node, wherein at least one of said local network node and said remote network node are in physical motion during operation, comprising:
   maintaining, at the local network node, a persistent record for storing a plurality of data groups, wherein each said data group is associated with one of the telecommunications system nodes, and each said data group comprises node identifying data and configuration data;
   periodically sending, from the local network node to each remote node identified in the persistent record, a presence message comprising data identifying the local network node and position data of the local network node;
   receiving, at the local network node, an incoming presence message sent by said the remote network node, said incoming presence message containing data identifying the remote network node and position data of the remote network node;
   determining a distance between the local network node and the remote network node; and
   adjusting the power of the RBS based on the distance and a predetermined threshold value.

2. The method of claim 1, wherein the power of the RBS is wilted when the distance is less than the predetermined threshold.

3. The method of claim 1, wherein the RBS of the local network node is wilted only after the determining that the distance is within the predetermined threshold value over a predetermined number sequential presence message transmit time intervals.

4. The method of claim 1, wherein the power is adjusted only if a priority condition between the local and remote nodes is satisfied.

5. The method of claim 4, wherein priority condition is satisfied if a MAC address of the local network node is greater than a MAC address of the remote network node.

6. The method of claim 1, wherein the data groups stored in the persistent record, and the sent and received presence messages each comprise information relating to whether a RBS of the associated network node is wilted or radiating, whether a proximity handling function is enabled or disabled, and a wilting dependency indication for each remote network node having previously thrown the proximity handling function and presently causing a wilting condition, the method further comprising:
   allowing the RBS to continue radiating if the proximity handling function is disabled for either the local network node or the remote network node, and the data group associated with the local network node indicates RBS of the local network node is radiating; or
   if the RBS of the local network node is wilted:
   clearing the wilting dependency for the remote node;
   radiating the RBS only if no wilting dependency indications exist for any other remote network node.

7. The method of claim 1, wherein the data groups stored in the persistent record, and the sent and received presence messages each comprise information relating to whether the associated network node RBS is wilted or radiating, an indication of whether the position data is valid or invalid, and a wilting dependency indication for each remote network node having previously thrown the proximity handling function and presently causing a wilting condition, the method further comprising:
   allowing the RBS to continue radiating if the position data is invalid for either the local network node or the remote network node, and the data group associated with the local network node indicates the RBS of the local network node is radiating; or
   clearing the wilting dependency for the remote node if the RBS of the local network node is wilted, and
   radiating the RBS only if no wilting dependency indications exist for any other remote network node.

8. The method of claim 7, wherein clearing the wilting dependency and radiating the RBS occur only after an indication that the position data is invalid is received in presence messages from the remote network node over a predetermined number of sequential presence message transmit time intervals.

9. The method of claim 1, wherein the data groups stored in the persistent record, and the sent and received presence messages each comprise information relating to whether the associated network node RBS is wilted or radiating, whether a proximity handling function is enabled or disabled, and a wilting dependency indication for each remote network node having previously thrown the proximity handling function and presently causing a wilting condition, the method further comprising:
   tracking whether an incoming presence message arrives within an expected presence message transmit interval, and if the expected incoming presence message fails to arrive within the presence message transmit interval:
      allowing the RBS to continue radiating if the proximity handling function is enabled for both the local network node or the remote network node, and the data group associated with the local network node indicates RBS of the local network node is radiating; or
      clearing the wilting dependency for the remote node if the RBS of the local network node is wilted; and
      radiating the RBS only if no wilting dependency indications exist for any other remote network node.

10. The method of claim 9, wherein clearing the wilting dependency and radiating the RBS only occur only after the expected incoming presence message fails to arrive from the remote network node over a predetermined number of sequential presence message transmit time intervals.

11. The method of claim 1, wherein each telecommunication system node is self-contained.

12. The method of claim 1, wherein each telecommunication system node is mobile.

13. A portable telecommunications system, comprising:
   a radio base station (RBS) for radiating an information signal;
   a location determining device for providing location information about the portable telecommunications system, wherein said portable telecommunications system is capable of physical motion during operation;
   memory for storing a plurality of data groups, wherein each said data group comprises node identifying data associated with a telecommunications system node among a network of telecommunications nodes including the portable telecommunications system and a remote telecommunications system, and configuration data comprising a predetermined threshold value;
   a program management module for periodically sending, from the portable telecommunications system to each remote telecommunications system identified in the memory, a presence message comprising data identifying the portable telecommunications system and the location information about the portable telecommunications system, and for receiving a presence message sent from the remote telecommunication system comprising information identifying the remote communications system and location information about the remote telecommunications system; and
   a proximity handing module for determining a distance between the portable telecommunications system and the remote telecommunications system from the location information and adjusting the power of the RBS based on the distance and the predetermined threshold value.

14. The portable telecommunications system of claim 13, wherein the power of the RBS is wilted when the distance is less than the predetermined threshold value.

15. The portable telecommunications system of claim 13, wherein the RBS is a NodeB.

16. The method of claim 13, wherein the RBS is wilted only if a priority condition between the portable telecommunications system and the remote telecommunications system is satisfied.

17. The method of claim 16, wherein priority condition is satisfied if the MAC address of the local network node is greater than the MAC address of the remote network node.

18. The method of claim 13, wherein the proximity handing module adjusts the power of the RBS only after the determining that the distance over a predetermined number sequential presence message transmit time intervals.

19. The method of claim 13, wherein the portable telecommunication system is self-contained.

20. The method of claim 13, wherein the portable telecommunication system is mobile.

* * * * *

UNITED STATES PATENT AND TRADEMARK OFFICE
CERTIFICATE OF CORRECTION

PATENT NO. : 8,135,379 B2
APPLICATION NO. : 12/105932
DATED : March 13, 2012
INVENTOR(S) : Ramachandran et al.

It is certified that error appears in the above-identified patent and that said Letters Patent is hereby corrected as shown below:

On the Title page, Item (73), under "Assignee", in Column 1, Line 1, delete "Telefoanktiebolaget" and insert -- Telefonaktiebolaget --, therefor.

IN THE SPECIFICATIONS:

In Column 2, Line 63, delete "handing" and insert -- handling --, therefor.

In Column 5, Line 49, delete "(PDN))," and insert -- (PDN), --, therefor.

In Column 5, Line 63, delete "Mobil" and insert -- Mobile --, therefor.

In Column 6, Line 41, delete "entity," and insert -- entity. --, therefor.

In Column 8, Line 23, delete "interface" and insert -- interface, --, therefor.

In Column 19, Lines 53-54, delete "configuration" and insert -- configuration, --, therefor.

In Column 28, Lines 7-8, delete "LeavingCommunityind" and insert
-- LeavingCommunityInd --, therefor.

IN THE CLAIMS:

In Column 38, Line 14, in Claim 13, delete "handing" and insert -- handling --, therefor.

In Column 38, Line 25, in Claim 16, delete "The method of claim 13," and insert -- The portable telecommunications system of claim 13, --, therefor.

In Column 38, Line 29, in Claim 17, delete "The method of claim 16," and insert -- The portable telecommunications system of claim 16, --, therefor.

Signed and Sealed this
Third Day of July, 2012

David J. Kappos
*Director of the United States Patent and Trademark Office*

CERTIFICATE OF CORRECTION (continued)
U.S. Pat. No. 8,135,379 B2

In Column 38, Line 32, in Claim 18, delete "The method of claim 13," and insert -- The portable telecommunications system of claim 13, --, therefor.

In Column 38, Lines 32-33, in Claim 18, delete "handing" and insert -- handling --, therefor.

In Column 38, Line 36, in Claim 19, delete "The method of claim 13," and insert -- The portable telecommunications system of claim 13, --, therefor.

In Column 38, Line 38, in Claim 20, delete "The method of claim 13," and insert -- The portable telecommunications system of claim 13, --, therefor.